United States Patent
Jung et al.

(10) Patent No.: US 9,621,818 B2
(45) Date of Patent: Apr. 11, 2017

(54) MOBILE TERMINAL HAVING DUAL CAMERAS TO CREATED COMPOSITE IMAGE AND METHOD THEREOF

(71) Applicant: LG ELECTRONICS INC., Seoul (KR)

(72) Inventors: Seyoon Jung, Seoul (KR); Hoonsang Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/260,074

(22) Filed: Apr. 23, 2014

(65) Prior Publication Data

US 2015/0049234 A1 Feb. 19, 2015

(30) Foreign Application Priority Data

Aug. 16, 2013 (KR) .................. 10-2013-0097053

(51) Int. Cl.
 *H04N 5/232* (2006.01)
 *H04N 5/225* (2006.01)
 *H04N 5/262* (2006.01)
 *H04N 5/272* (2006.01)

(52) U.S. Cl.
 CPC ........... *H04N 5/262* (2013.01); *H04N 5/2258* (2013.01); *H04N 5/23293* (2013.01); *H04N 5/2621* (2013.01); *H04N 5/272* (2013.01)

(58) Field of Classification Search
 CPC .................................... H04N 1/2145
 USPC .................................... 348/333.05
 See application file for complete search history.

(56) References Cited

U.S. PATENT DOCUMENTS

| 8,866,943 | B2 * | 10/2014 | Park et al. | 348/267 |
| 2003/0007700 | A1 * | 1/2003 | Gutta | G06T 17/00 382/282 |
| 2003/0189647 | A1 * | 10/2003 | Kang | H04N 5/232 348/207.99 |
| 2005/0036044 | A1 * | 2/2005 | Funakura | 348/239 |
| 2005/0134939 | A1 * | 6/2005 | Ikeda | H04N 1/00448 358/471 |
| 2008/0084482 | A1 * | 4/2008 | Hansson | H04N 5/23232 348/218.1 |
| 2009/0244296 | A1 * | 10/2009 | Petrescu | H04N 5/23219 348/207.99 |
| 2010/0079492 | A1 * | 4/2010 | Nakamura | G06T 11/00 345/634 |
| 2010/0118175 | A1 * | 5/2010 | Bruce | H04N 5/23293 348/333.05 |
| 2011/0169987 | A1 * | 7/2011 | Gann | H04N 5/232 348/246 |

(Continued)

FOREIGN PATENT DOCUMENTS

| EP | 1 507 386 A1 | 2/2005 |
| EP | 2 472 845 A2 | 7/2012 |

*Primary Examiner* — Twyler Haskins
*Assistant Examiner* — Akshay Trehan
(74) *Attorney, Agent, or Firm* — Birch, Stewart, Kolasch & Birch, LLP

(57) ABSTRACT

A mobile terminal including a first camera on a first surface of the mobile terminal; a second camera on a second surface of the mobile terminal; a display unit; and a controller configured to control the first camera to obtain a first image, control the second camera to obtain a plurality of second images, and display the first image and the plurality of second images on the display unit.

9 Claims, 27 Drawing Sheets

(56) References Cited

U.S. PATENT DOCUMENTS

| | | |
|---|---|---|
| 2012/0120186 A1 | 5/2012 | Diaz et al. |
| 2012/0198386 A1* | 8/2012 | Hautala ................ G06F 3/0481 |
| | | 715/838 |
| 2012/0218431 A1 | 8/2012 | Matsuoto et al. |
| 2013/0222671 A1* | 8/2013 | Tseng ................ H04N 5/23216 |
| | | 348/333.11 |
| 2013/0235224 A1 | 9/2013 | Park et al. |
| 2014/0152873 A1* | 6/2014 | Troxel ................ H04N 5/2621 |
| | | 348/239 |
| 2014/0192198 A1* | 7/2014 | Tsau ................ H04N 21/41407 |
| | | 348/159 |

* cited by examiner

FIG. 22
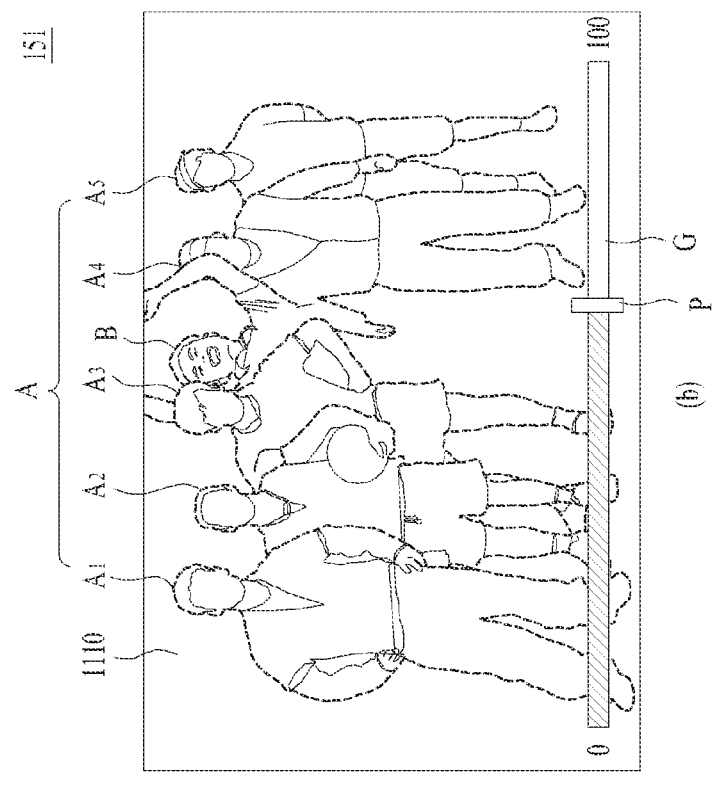
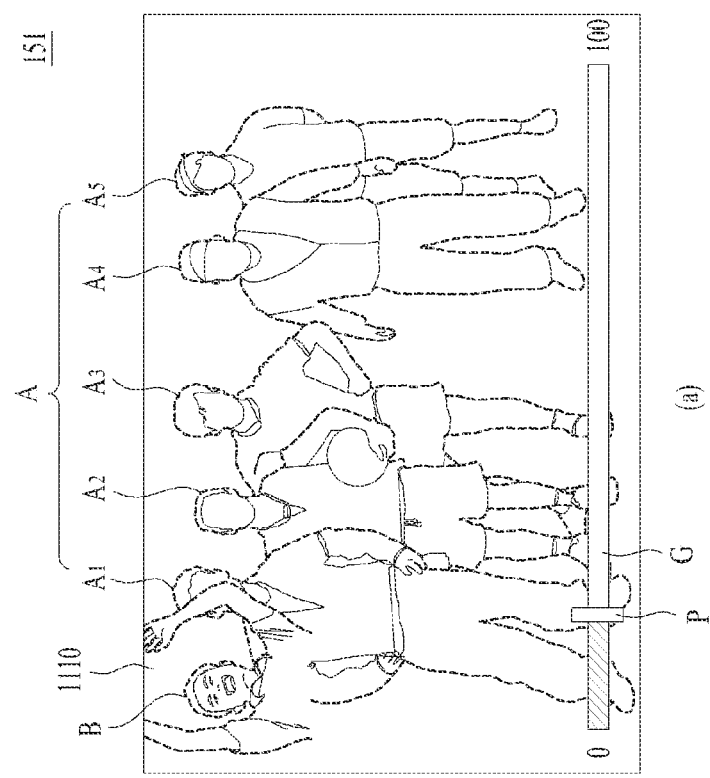

MOBILE TERMINAL HAVING DUAL CAMERAS TO CREATED COMPOSITE IMAGE AND METHOD THEREOF

Pursuant to 35 U.S.C. §119(a), this application claims the benefit of earlier filing date and right of priority to Korean Application No. 10-2013-0097053, filed on Aug. 16, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mounted terminals.

There are ongoing efforts to support and increase the functionality of mobile terminals. Such efforts include software and hardware improvements, as well as changes and improvements in the structural components which form the mobile terminal.

Techniques for taking photos using a camera of the mobile terminal or techniques for editing the taken photos have been generalized already. Generally, a camera is built in each of front and rear sides of a mobile terminal. In particular, the rear camera is mainly used for photographing a third party or a background, while the front camera is mainly used for the user of the mobile terminal to photograph himself.

However, the functions of the cameras are limited and thus can inconvenience the user.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a desired image can be selected from a plurality of images obtained from consecutively photographing a photographer.

Another object of the present invention is to provide a mobile terminal and controlling method thereof by which an image of a photographer and an image of a photographing target can be naturally synthesized together.

A further object of the present invention is to provide a mobile terminal and controlling method thereof, by which an image of a photographer and an image of a photographing target can be independently edited/modified.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a first camera configured to obtain a first image, a second camera configured to obtain a second image, a controller controlling the second camera to obtain a plurality of second images, and a display unit displaying the obtained first image and a plurality of the obtained second images.

In another aspect of the present invention, as embodied and broadly described herein, a mobile terminal according to one embodiment of the present invention may include a first camera configured to obtain a first image including a first object, a second camera configured to obtain a second image including a second object, a controller extracting the second object from the obtained second image, and a display unit displaying at least one pinion of the extracted second object so the at least one portion of the extracted second object overlays the obtained first image.

In a further aspect of the present invention, as embodied and broadly described herein, a method of controlling a mobile terminal according to one embodiment of the present invention may include the steps of obtaining a first image including a first object, obtaining a second image including a second object, extracting the second object from the obtained second image, and displaying at least one portion of the extracted second object so the at least one portion of the extracted second object overlays the obtained first image.

Effects obtainable from the present invention is not limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 22 is a diagram illustrating one example of a first image and a second object displayed on a screen of a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments can be utilized, and structural, electrical, as well as procedural changes can be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
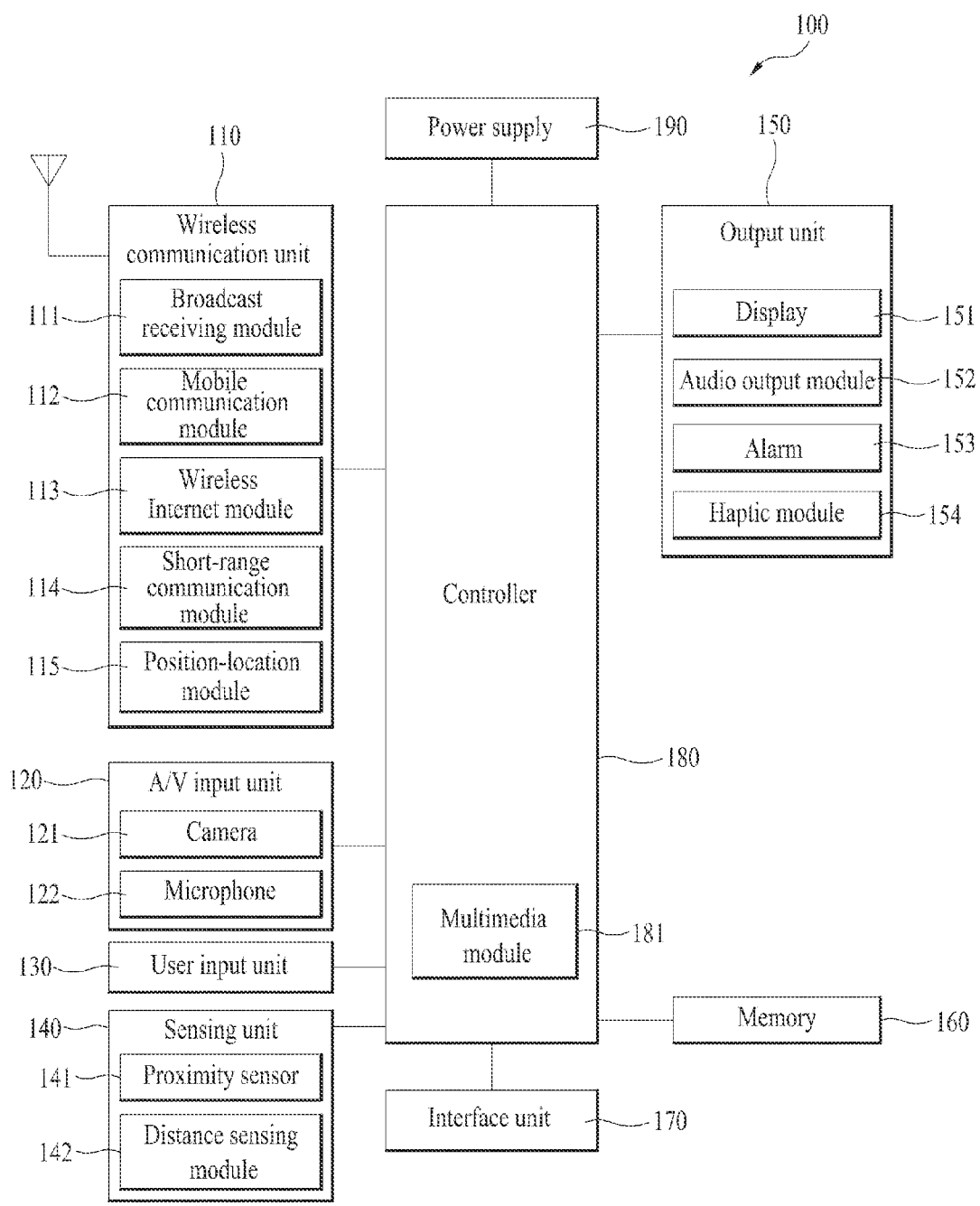
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 including a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 also shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal can be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H). The broadcast receiving module 111 can be configured to receive broadcast signals transmitted from various types of broadcast systems.

In a non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 can be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module can be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module can be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141 and a distance sensing module 142.

When an image is obtained using the rear camera 121', the distance sensing unit 142 can obtain information on a distance between a specific object in the image and the mobile terminal 100. For instance, when an image is obtained using the camera 121', the distance sensing unit 142 can obtain distance information on a focused region in a preview image within a preview region of the display 151 or distance information on an object corresponding to a region of a screen touched by a user. In this instance, the distance information on the object means a distance to a specific object from the distance sensing unit 142. When an object includes a plurality of sub-objects, the distance sensing unit 142 can obtain distance information on each of a plurality of the sub-objects.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interlace (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 can be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor defects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 134 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 can be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 can be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identify device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 can be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power can be internal power, external power, or combinations thereof.

Various embodiments described herein can be implemented in a computer-readable medium using, for example, computer software, hardware, or some combination thereof. For a hardware implementation, the embodiments described herein can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein can be implemented with separate software modules, such as procedures and functions, each of which perform one or more of the functions and operations described herein. The software codes can be implemented with a software application written in any suitable programming language and can be stored in memory such as the memory 160, and executed by a controller or processor, such as the controller 180.

Figure 2A:
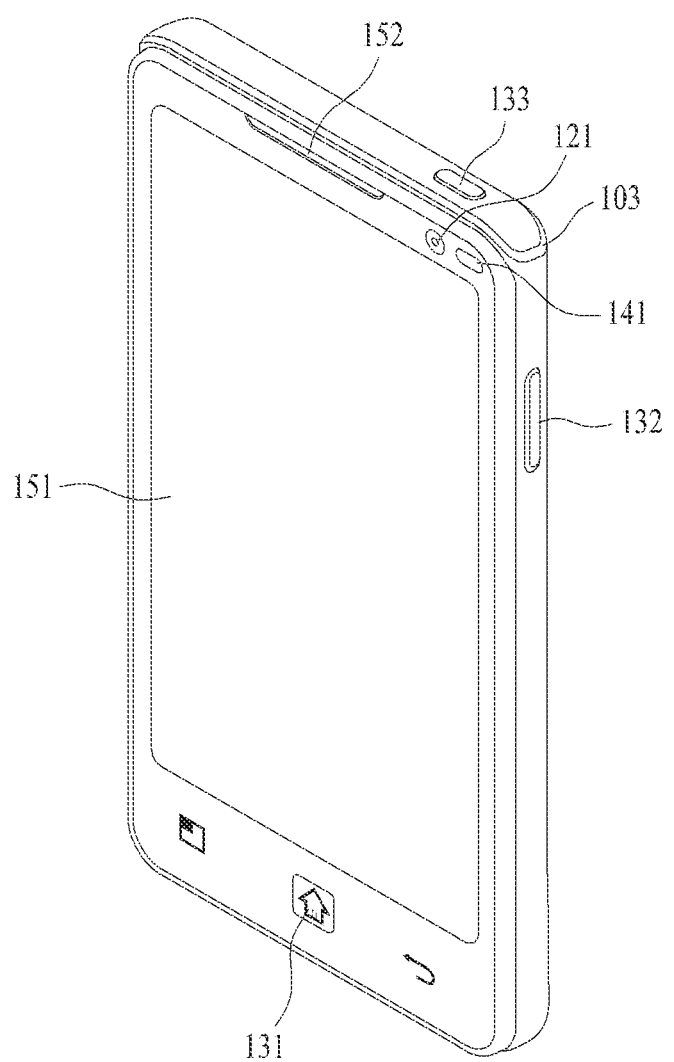
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. However, the mobile terminal 100 can be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
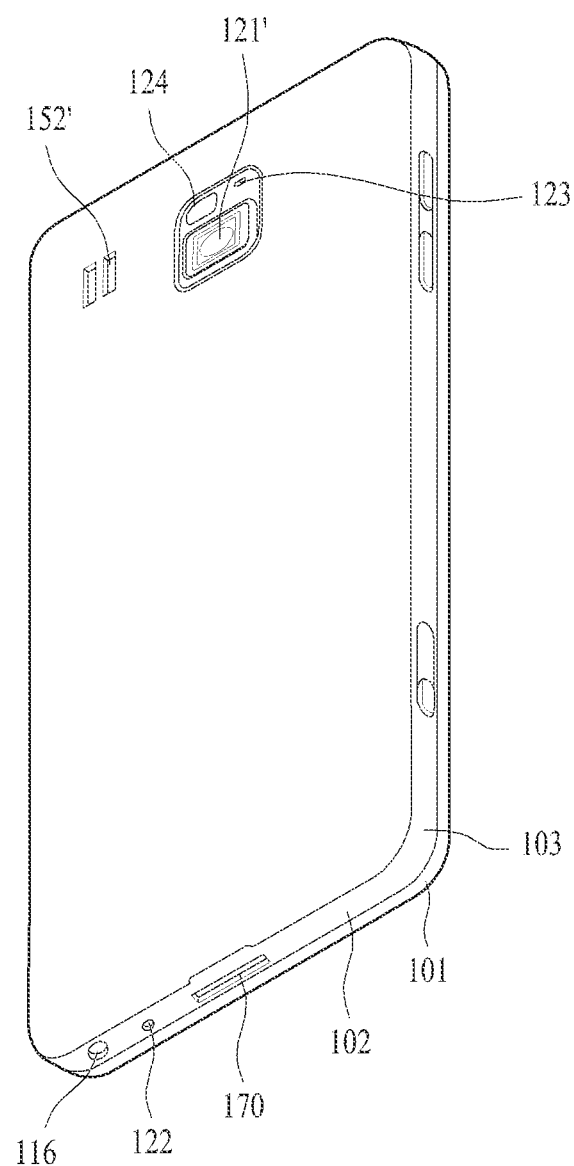
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and can be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this instance, if the display 151 is configured to output visual information from its both faces, it can recognize the visual information via the touchpad as well. The information output from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, embodiments related to a controlling method implemented in the above-configured mobile terminal 100 are explained with reference to the accompanying drawings.

For clarity and convenience of the following description, assume that a mobile terminal 100 mentioned in the following description includes at least one of the components shown in FIG. 1. In particular, a mobile terminal 100 according to an embodiment of the present invention may include the user input unit 130, the display 151, the memory 160 and the controller 180. In some instances, the mobile terminal 100 according to an embodiment of the present invention may further include the proximity sensor 141. If the display module 151 includes a touchscreen 151, implementation of the following embodiments of the present invention can be further facilitated. Therefore, the following description is made on the assumption that the display module 151 includes the touchscreen 151. Moreover, if the user input unit 130 includes the touch sensor 137, the touchscreen 151 can be used as the user input unit 130.

According to an embodiment of the present invention, the mobile terminal 100 can become a sender terminal or a receiver terminal depending on a corresponding embodiment.

The mobile terminal according to one embodiment of the present invention preferably includes the rear camera 121', the front camera 121, the controller 180, the user input unit 130, the display 151, the distance sensing unit 142 and the memory 160. However, this configuration is not mandatory, and that at least one portion of the above-enumerated components can be omitted. For clarity of the following description, the rear camera 121' and the front camera 121 are called a first camera and a second camera, respectively.

The first camera 121' obtains a first image. In this instance, the first camera 121' may include a rear camera provided to a rear part of the mobile terminal 100. In particular, the first camera 121' obtains an image for a photographing target (e.g., a third party, a background, etc.). In addition, the second camera 121 obtains a second image. In this instance, the second camera 121 may include a front camera provided to a front part of the mobile terminal 100. In particular, the second camera 121 obtains an image for a photographer.

If a photographing command is received through the user input unit 130, the controller 180 simultaneously controls the first camera 121' and the second camera 121 to obtain the first image and the second image, respectively.

According to an embodiment, the controller 180 controls the second camera 121 to obtain a plurality of second images. If a photographing command is received through the user input unit 130, the second camera 121 obtains a plurality of the second images by consecutively photographing a subject for a preset duration. When a user of the mobile terminal 100 simultaneously photographs a third party and the user himself, because the user is concentrated on photographing the third party, it is difficult for the user to pose appropriately or look at a camera lens correctly. According to an embodiment of the present invention, as the second camera 121 is enabled to obtain a plurality of second images, a user can afford a time to pose for a picture naturally.

The display 151 displays the obtained first image and a plurality of the obtained second images. The controller 180 can control the display 151 to display the first image and a plurality of the second images on a first region of a screen of the display 151 and a second region of the screen of the display 151, respectively. In addition, a plurality of the second images can be displayed by overlapping each other on the second region of the screen of the display 151. Alternatively, the controller 180 can control the display 151 to display a plurality of the second images so a plurality of the second images overlay the first image.

If a re-photographing command is received through the user input unit 130, the controller 180 controls the first camera 121' to re-obtain the first image or controls the second camera 121 to re-obtain the second image. In addition, the controller 180 can control the second camera 121 to re-obtain the second image once or plural times.

The controller 180 can create a plurality of preset images from applying a plurality of setting conditions to the second image and can then control a plurality of the created preset images to be displayed on the display 151. In this instance, when a plurality of the second images are obtained through the second camera 121, the second image before applying the setting conditions may correspond to a prescribed one of the second images selected by a user.

The controller 180 can extract a first image from the first image obtained by the first camera 121'. In this instance, the first object may correspond to a third party the user of the mobile terminal 100 intends to photograph. In some instances, the first object may include a plurality of sub-objects. When there are a plurality of third parties the user of the mobile terminal 100 intends to photograph, the sub-object may mean each person of the third parties. However, it is not necessary is not necessary for the first object to indicate the person only. Instead, the first object may conceptionally include one of a specific object hand-held by a person, a specific thing connected to a person and the like.

The controller 180 can extract a second object from the second image obtained by the second camera 121. In this instance, the second object may correspond to the user of the mobile terminal 100 who is photographing the third party. However, it is not necessary for the second object to indicate the person only. Instead, the second object may conceptionally include one of a specific object hand-held by a person, a specific thing connected to a person and the like.

The controller 180 can control the display 151 to display at least one portion of the extracted second object so the at least one portion of the second object overlays the first image. In particular, if the at least one portion of the second object is displayed by overlaying the first image, it may mean that the second object can be displayed so the whole second object overlays the first image or that one portion of the second object overlays the first image without displaying the rest of the second object. In the latter case, in an image created from synthesizing the first image and the second object together, the rest of the second object is not present.

According to an embodiment, the controller 180 can adjust a size of the second object depending on a size of the first object. Further, the controller 180 can adjust a size of the first object depending on a size of the second object. In this instance, a size of an object means a width of a specific part of the object, e.g., a width of a face region of a person corresponding to the object. The memory 160 may store an algorithm for extracting an object from an image, an algorithm for recognizing a face region in an extracted object, and the like in advance. According to an embodiment of the present invention, if the sizes of the first object and the second object are adjusted to belong to a similar range, the first image and the second image can be synthesized together more naturally.

The controller 180 can detect location information of the first object. In this instance, the location information of the first object includes information indicating where the first object is located in the first image. For instance, the location information of the first object may mean information indicating that the first object inclines toward a top, bottom, left or right side in the first image, information indicating a size of a vacant space next to a top, bottom, left or right side of the first object, and the like. When the first object includes a plurality of sub-objects, the controller 180 can detect at least one of a size of each of a plurality of the sub-objects, a space between the two sub-objects adjacent to each other and location information of each of a plurality of the sub-objects. The memory 160 may store an algorithm for detecting information on an object and the like in advance.

Based on a result of the detection of the first object, the controller 180 can control the display 151 to display at least one indicator indicating each of at least one candidate for a region at which the second object will be located in the first image. According to an embodiment of the present invention, a candidate for a region, in which the second object can be synthesized more naturally in the first image, is proposed to a user, whereby user's convenience can be enhanced.

When the first image is obtained using the first camera 121', the distance sensing module 142 can obtain distance information of the first object in the first image. For instance, when the first image is obtained using the first camera 121', the distance sensing module 142 can obtain distance information of the first object corresponding to a focused region of a preview image in a first preview region of the display 151 or a region of a screen touched by a user. In this instance, the distance information of the first object means a distance to the first object from the distance sensing module 142. When the first object includes a plurality of sub-objects, the distance sensing module 142 can obtain distance information of each of a plurality of the sub-objects.

The controller 180 can control the obtained distance information to be saved in the memory 160 by being matched to the first object. In addition, the controller 180 can save the obtained distance information of each of a plurality of the sub-objects in the memory 160 by being matched to the corresponding sub-object.

According to an embodiment, the distance sensing module 142 can be implemented by being included in the controller 180. In addition, the memory 160 can be implemented by being included in the controller 180 as well.

If a distance setting command for setting a distance of the second object is received through the user input unit 130, the controller 180 can determine the order relationship between the second object and the first object adjacent to the second object in accordance with the received distance setting command. For instance, while the second object is displayed by overlaying the first image, if the distance setting command is received, the controller 180 access the distance information of the first object in the first image from the memory 160 and can then determine the order relationship between the second object and the first object adjacent to the second object by comparing the accessed distance information of the first object to the distance of the second object by the received distance setting command.

Subsequently, in accordance with the determined order relationship, the controller 180 can determine a range of the second object that will overlay the first image. In particular, the second object can be displayed by entirely overlaying the first image depending on the determined order relationship. Alternatively, the second object can be displayed so a portion of the second object overlays the first image while the rest of the second object is not displayed by being blocked by the first object, depending on the determined order relationship. According to an embodiment of the present invention, at least one portion of the second object is displayed by overlaying the first image by determining the order relationship between the first object and the second object, whereby the first image and the second image can be synthesized together more naturally.

According to an embodiment, each of the first image obtained from the first camera 121' and the second image obtained from the second camera 121 may include a preview image. In particular, the mobile terminal 100 extracts a first object and a second object from a first preview image and a second preview image in preview mode, respectively, displays the extracted second image on the first preview image, and displays at least one indicator indicating at least one candidate for a region at which the second object will be located, and the like. Thus, the above-described embodiments can be implemented in the preview mode.

Figure 3:
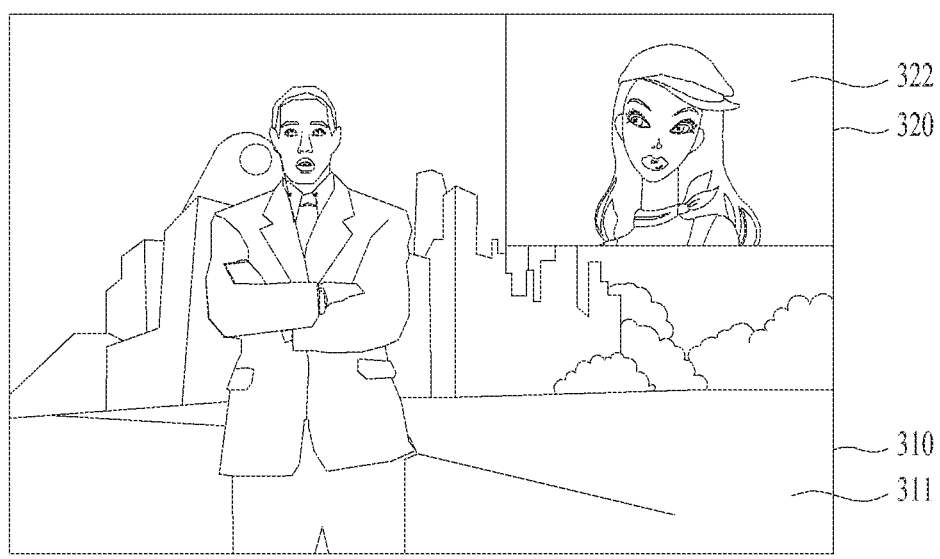
FIG. 3 and FIG. 4 are diagrams illustrating examples of first and second preview regions displayed on a screen of a mobile terminal according to one embodiment of the present invention.
Figure 4:
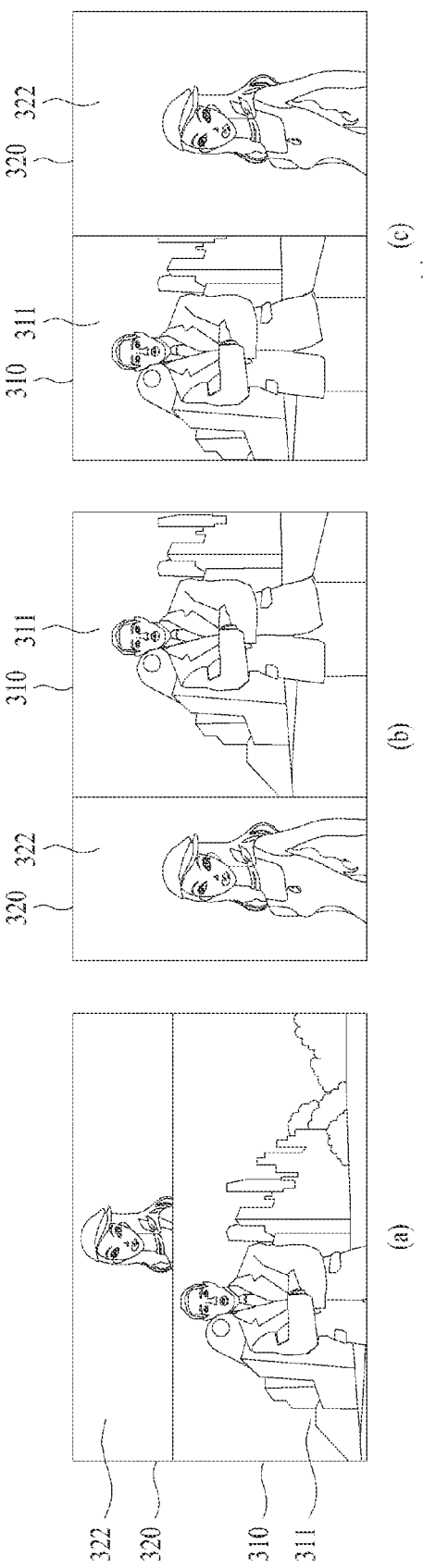

Next, FIGS. 3 and 4 are diagrams illustrating examples of first and second preview regions displayed on a screen of a mobile terminal according to one embodiment of the present invention.

Referring to FIG. 3, the display 151 of the mobile terminal 100 displays a first preview region 310 for outputting a first preview image 311 obtained by the first camera and a second preview region 320 for outputting a second preview image 322 obtained by the second camera.

In addition, the second preview region 320 can be shifted to another location in the first preview region 310 when a user touches & drags a random region within the second preview region 320. In addition, a size of the second preview region 320 can be adjusted so the user touches two points of an outer frame of the second preview region 320 and then drags the touched points in and out.

According to an embodiment, referring to FIGS. 4 (a) to 4 (c), the first preview region 310 and the second preview region 320 can be provided to a screen at various ratios. The ratio between the first preview region 310 and the second preview region 320 can be determined by being randomly selected from preset ratio modes by a user. Alternatively, the ratio between the first preview region 310 and the second preview region 320 can be determined when a user touches & drags the first preview region 310 or the second preview region 320.

According to an embodiment of the present invention, the second camera can obtain a plurality of second images. Examples of a process for the second camera to obtain a plurality of second images according to one embodiment of the present invention are described in detail with reference to FIGS. 5 and 6 as follows.

Figure 5:
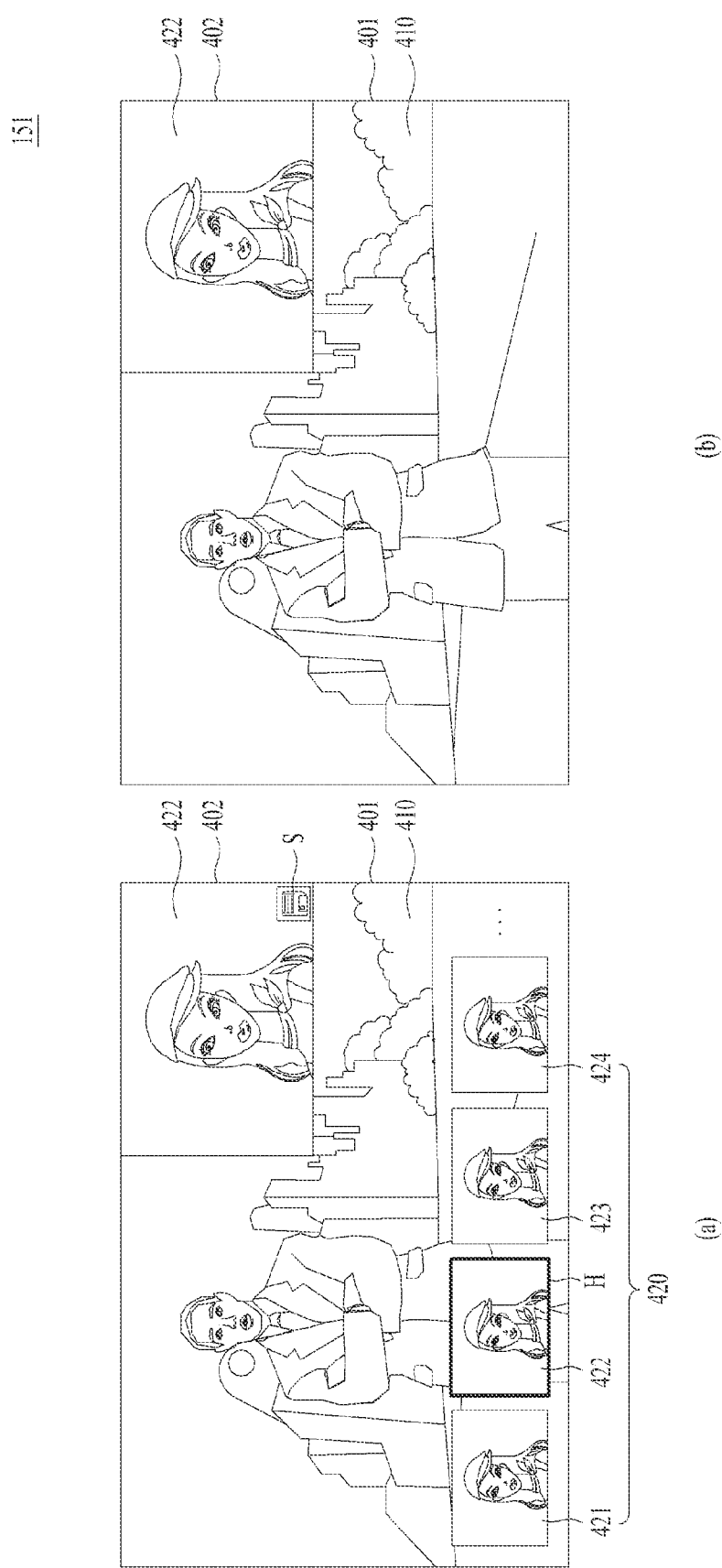
FIG. 5 is a diagram illustrating one example of a first image and a plurality of second images displayed on a screen of a mobile terminal according to one embodiment of the present invention.

FIG. 5 is a diagram illustrating one example of a first image and a plurality of second images displayed on a screen of a mobile terminal according to one embodiment of the present invention.

Referring to FIG. 5 (a), the display 151 of the mobile terminal 100 displays a first image 410 obtained from the first camera and a plurality of second images 420 obtained from the second camera. If a photographing command is detected, the controller 180 of the mobile terminal 100 controls the first camera to obtain the first image 410 and also controls the second camera to obtain a plurality of the second images 420. In this instance, the first image 410 includes an image for a photographing target (e.g., a third party and a background) intended to be photographed by a user of the mobile terminal 100 and the second image 420 includes an image for the user of the mobile terminal 100. In addition, while a plurality of the second images 420 are obtained, the user of the mobile terminal 100 can afford a time to get into an appropriate pose.

A plurality of the second images 420 can be displayed by overlaying the first image 410. A plurality of the second images 420 can be enumerated as thumbnail images on the first image 410, respectively. The user can select a desired second image 422 from a plurality of the second images 420 for example. In particular, the user can select a desired image by touching a prescribed one of a plurality of the second images 420.

The first image 410 is displayed on a first region 401 of a screen of the display 151 of the mobile terminal 100, while the second image 422 selected by the user can be displayed on a second region 402 of the screen of the display 151 of the mobile terminal 100 for example.

A prescribed image 422 selected from a plurality of the second images 420 by the user can be indicated by a highlight region H that outlines the prescribed image 422. For instance, if the user selects a second image 422 located in the second place from a plurality of the second images 420, the highlight region H is displayed around the selected second image 422 and the same image of the selected second image 422 can be displayed on the second region 402. In some instances, if a prescribed image is not selected from a plurality of the second images 420 by the user However, the mobile terminal 100 can be implemented to display the same image of the second image 421 enumerated in the first place among a plurality of the second images 420 on the second region 402.

If the user selects a save button S located in the second region 402, the second image 422 located in the second region 402 is saved in the memory for example and the rest of the second images 421, 423, 424 . . . are removed from the screen, whereby a screen shown in FIG. 5 (b) can be displayed.

The second region 402 can be shifted to another location in the first region 401 so the user touches & drags a random region in the second region 402. In addition, a size of the second region 402 can be adjusted so the user touches two points of an outer frame of the second region 402 and then drags the touched points in and out.

When a user command is input through a touchscreen provided to the display 151, the display 151 can play a role as an output unit and can also play a role as the user input unit 130.

Figure 6:
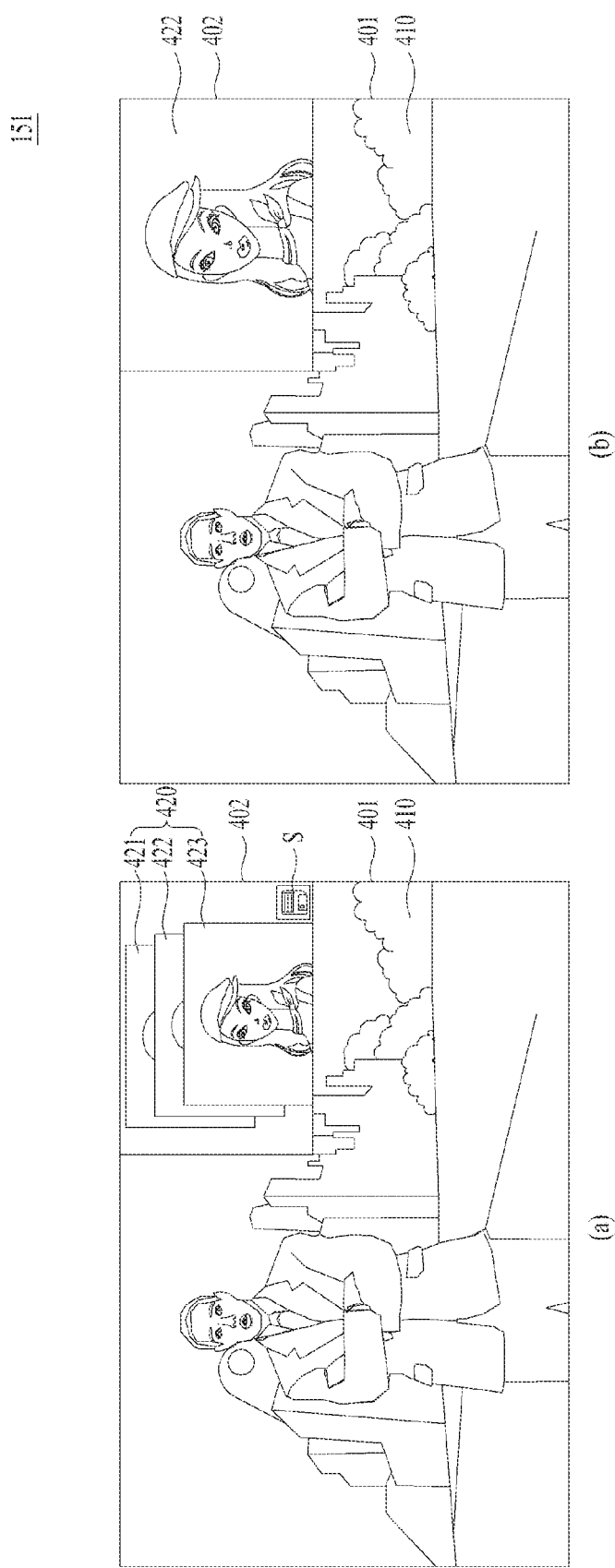
FIG. 6 is a diagram illustrating another example of a first image and a plurality of second images displayed on a screen of a mobile terminal according to one embodiment of the present invention.

Next, FIG. 6 is a diagram illustrating another example of a first image and a plurality of second images displayed on a screen of a mobile terminal according to one embodiment of the present invention.

Referring to FIG. 6 (a), the display 151 of the mobile terminal 100 displays a first image 410 obtained from the first camera and a plurality of second images 420 obtained from the second camera. If a photographing command is detected, the controller 180 of the mobile terminal 100 controls the first camera to obtain the first image 410 and also controls the second camera to obtain a plurality of the second images 420. In this instance, the first image 410 includes an image for a photographing target (e.g., a third party and a background) intended to be photographed by a user of the mobile terminal 100 and the second image 420 includes an image for the user of the mobile terminal 100. In addition, while a plurality of the second images 420 are obtained, the user of the mobile terminal 100 can afford a time to get into an appropriate pose.

The first image 410 can be displayed on a first region 401 of a screen of the display 151 of the mobile terminal 100, while a plurality of the second images 420 are displayed on a second region 402 of the screen of the display 151 of the mobile terminal 100. In addition, a plurality of the second images 420 can be displayed on the second region 402 by overlapping each other. For instance, a second image 421 obtained in the first place is arranged on a most lower part, a second image 422 obtained in the second place is arranged on the second image 421 by overlapping a portion of the second image 421, and a second image 423 obtained in the third place can be displayed on the second image 422 by overlapping a portion of the second image 422, for example, by which the order of arrangement is not limited.

The mobile terminal 100 controls a plurality of the second images 420 to be displayed by overlapping each other by being shifted little by little, thereby enabling the user to recognize that a plurality of the second images 420 exist.

If the user touches the second image 423 arranged on the most upper part in the second region 402, the mobile terminal 100 arranges the second image 422, which used to be arranged right under the touched second image 423, on the most upper part and also arranges the touched second image 423 on the most lower part, thereby rearranging the order of the arrangement of a plurality of the second images 420. However, this rearrangement order is just exemplary, by which the present invention is not limited. If a command for touching the second image 420 is received through the user input unit, the controller 180 of the mobile terminal 100 can rearrange a plurality of the second images 420 in the second region 402.

If the user selects a save button S located in the second region 402, the second image 423 located on the most upper part in the second region 402 is saved in the memory for example and the rest of the second images 421, 422, 424 . . . are removed from the screen, whereby a screen shown in FIG. 6 (b) can be displayed.

The second region 402 can be shifted to another location in the first region 401 so the user touches & drags a random region in the second region 402. In addition, a size of the second region 402 can be adjusted so the user touches two points of an outer frame of the second region 402 and then drags the touched points in and out.

Figure 7:
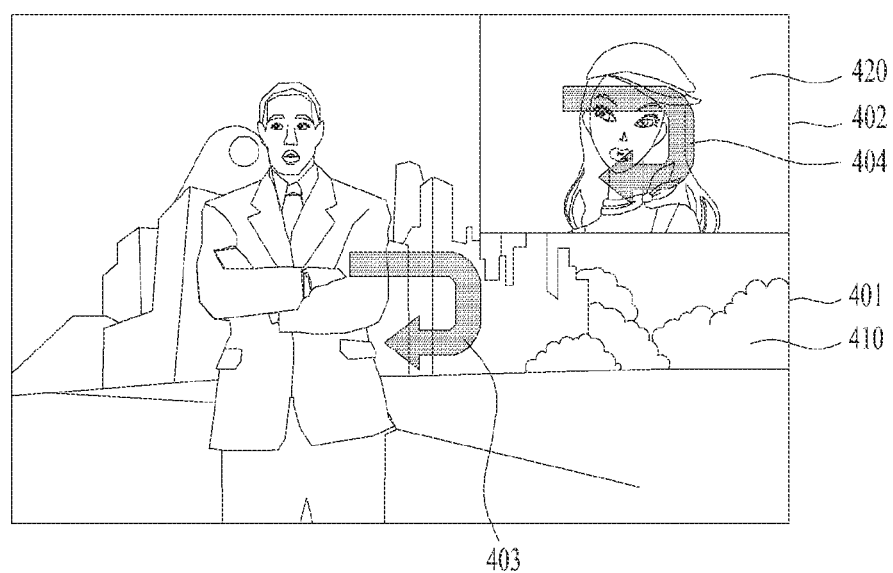
FIG. 7 is a diagram illustrating one example of a first image and a second image displayed on a screen of a mobile terminal according to one embodiment of the present invention.

FIG. 7 is a diagram illustrating one example of a first image and a second image displayed on a screen of a mobile terminal according to one embodiment of the present invention. Referring to FIG. 7, the display 151 of the mobile terminal 100 displays a first image 410 obtained from the first camera and a second image 420 obtained from the second camera. In particular, the second image 420 may include an image obtained by 1-time photographing through the second camera or a specific image selected by a user from a plurality of the second images obtained by plural photographing operations through the second camera.

The first image 410 can be displayed on a first region 401 of a screen of the display 151 of the mobile terminal 100 and the second image 420 can be displayed on a second region 402 of the screen of the display 151 of the mobile terminal 100. The display 151 of the mobile terminal 100 can display one rephotographing button 403 and another rephotographing button 404 on the first region 401 and the second region 402, respectively.

If the user selects the rephotographing button 403, the first camera enters a preview mode and a second preview image obtained by the second camera is then displayed on the second region 402. Thereafter, if a rephotographing command is detected, the controller 180 of the mobile terminal 100 controls the second camera to re-obtain the second image once or plural times and then controls the display 151 to display the obtained second image on the second image 402 or display the obtained second image on the first region 401 so the obtained second image overlays the first image 410.

According to the above-described embodiment, the user can select and rephotograph an undesired image of the first image 410 and the second image 420, whereby user's convenience can be enhanced.

Figure 8:
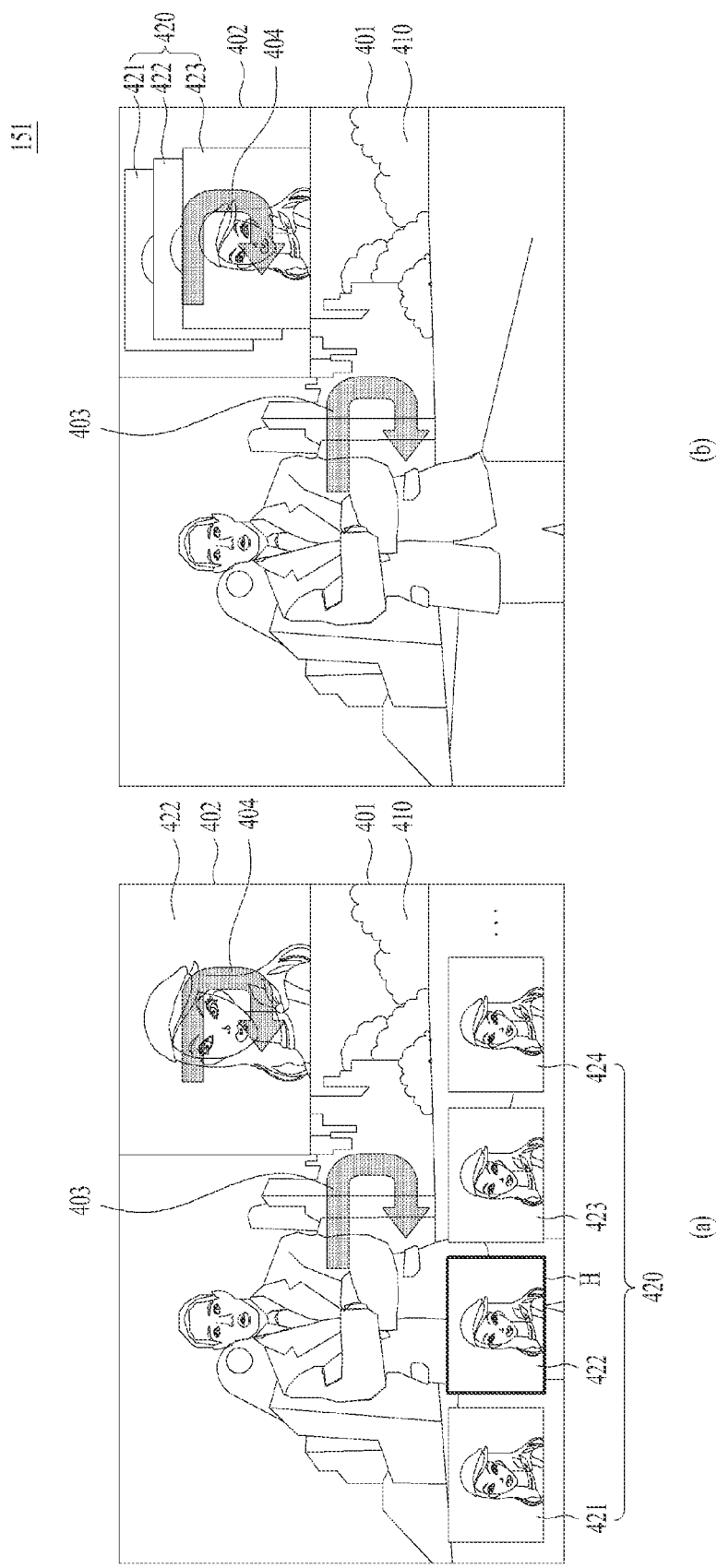
FIG. 8 is a diagram illustrating another example of first and second images displayed on a screen of a mobile terminal according to one embodiment of the present invention.

FIG. 8 is a diagram illustrating another example of first and second images displayed on a screen of a mobile terminal according to one embodiment of the present invention. According to the former description with reference to FIG. 7, if the second image is obtained once or one of a plurality of the second images is selected by a user, it is assumed that the first image or the second image is rephotographed. On the other hand, while a plurality of the second images are displayed, as shown in FIGS. 5 and 6, the mobile terminal 100 is implemented so that the first image or the second image can be rephotographed.

For instance, while the first image 410 and a plurality of the second images 420 are displayed (cf. FIG. 5), referring to FIG. 8 (a), the user selects a rephotographing button 403 or a rephotographing button 404 to rephotograph the first image 410 or the second image 420. In another instance, while the first image 410 and a plurality of the second images 420 are displayed (cf. FIG. 6), referring to FIG. 8 (b), the user selects a rephotographing button 403 or a rephotographing button 404 to rephotograph the first image 410 or the second image 420. In addition, if the user selects the rephotographing button 404, a plurality of the second images 420 are removed and the second image can be re-obtained through the second camera once or plural times.

According to an embodiment of the present invention, a second image obtained by a second camera can be edited independently from a first image. In the following description, examples of a process for editing a second image obtained by a second camera according to one embodiment of the present invention are explained with reference to FIGS. 9 to 13.

Figure 9:
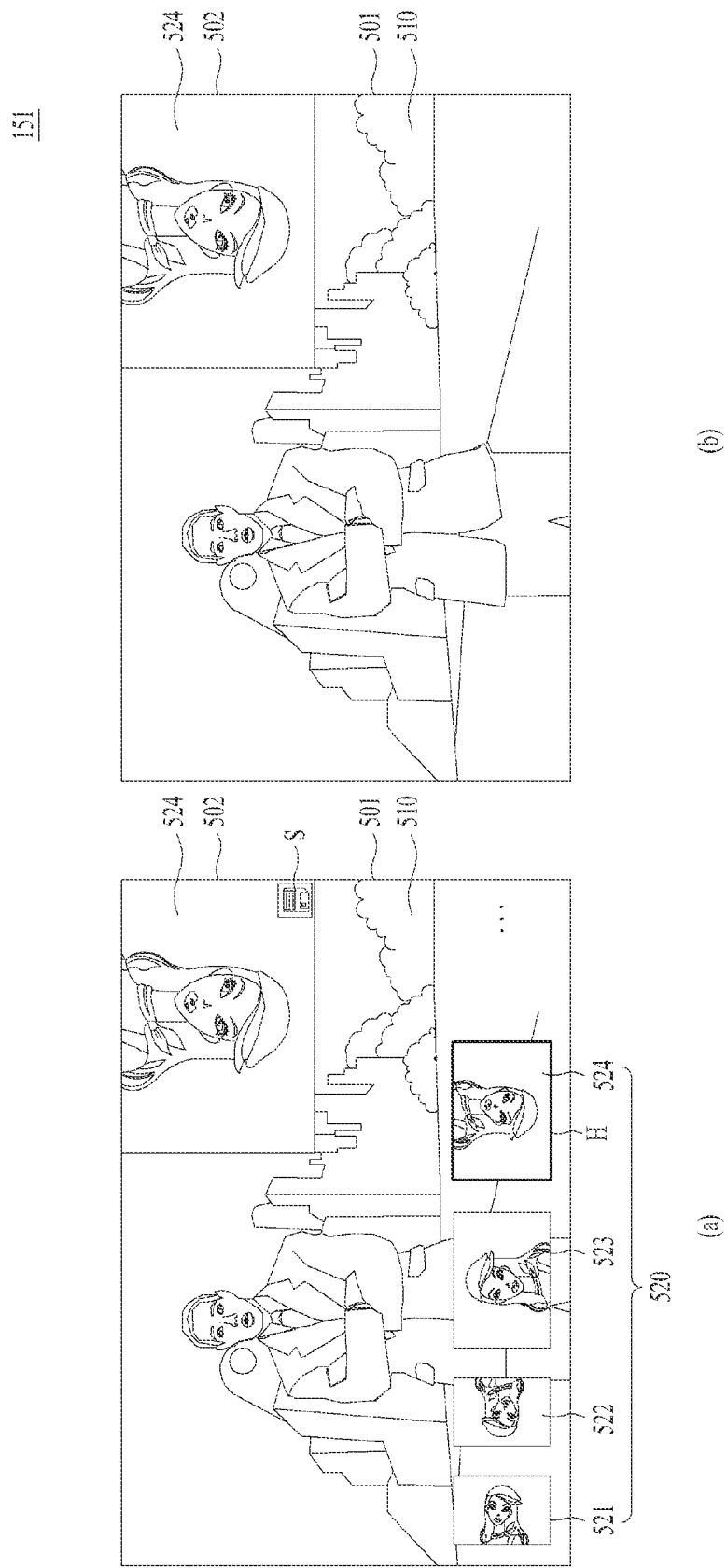
FIG. 9 is a diagram illustrating one example of a first image and a preset image displayed on a screen of a mobile terminal according to one embodiment of the present invention.

FIG. 9 is a diagram illustrating one example of a first image and a preset image displayed on a screen of a mobile terminal according to one embodiment of the present invention. Referring to FIG. 9, the display 151 of the mobile terminal 100 displays a first image 510 obtained by the first camera and a plurality of preset images 520. In this instance, a plurality of the preset images 520 mean the images created from applying a plurality of setting conditions to a second image obtained by the second camera through 1-time photographing or a specific image selected by a user from a plurality of second images obtained by the second camera through multiple photographing operations. In this instance, the setting condition may inclusively mean photo editing functions of all types (e.g., contrast, brightness, chroma, atmosphere, image size, image inclination, etc.) provided to the mobile terminal 100.

A plurality of the preset images 520 may include a first preset image 521 created from applying a first setting condition to the second image obtained by the second camera, a second preset image 522 created from applying a second setting condition to the second image obtained by the second camera, a third preset image 523 created from applying a third setting condition to the second image obtained by the second camera, a fourth preset image 524 created from applying a fourth setting condition to the second image obtained by the second camera, and the like. The number of the preset images may vary depending on an embodiment and no limitation is put on the number of the preset images. In addition, a type of the setting condition can be determined by a user in advance.

For instance, the first preset image 521 may include the image created from applying a setting condition for rotating the second image at 90 degrees clockwise, the second preset image 522 may include the image created from applying a setting condition for rotating the second image at 90 degrees counterclockwise, the third preset image 523 may include the image created from applying a setting condition for maintaining a current status of the second image, and the fourth preset image 524 may include the image created from applying a setting condition for rotating the second image at 180 degrees.

A plurality of the preset images 520 can be displayed by overlaying the first image 510. A plurality of the preset images 520 can be enumerated as thumbnail images on the first image 510, respectively. A user can select a prescribed desired preset image 524 from a plurality of the preset images 520 for example. For instance, the user can select a desired preset image from a plurality of the preset images 520 by touching the corresponding preset image.

The first image 510 can be displayed on a first region 501 of a screen of the display 151 of the mobile terminal 100 and the fourth preset image selected by the user can be displayed on a second region 502 of the screen of the display 151 of the mobile terminal 100.

A highlight region H can be displayed on an outline of the prescribed preset image (e.g., the preset image 524) selected by the user from a plurality of the preset images 520. For instance, if the user selects the fourth preset image 524 located in the fourth place from a plurality of the preset images 520, the highlight region H is displayed around the selected fourth preset image 524 and the same image of the selected fourth preset image 524 can be displayed on the second region 502. In some instances, before the user selects a prescribed image from a plurality of the preset images 520, it can implement the mobile terminal 100 so the same image of the first preset image 521 enumerated in the first place among a plurality of the preset images 520 can be displayed on the second region 502.

If the user selects a save button S located in the second region 502, the fourth preset image 524 located in the second region 502 can be saved in the memory and the rest of the preset images 521, 522, 523 . . . can be removed from the screen, whereby a screen shown in FIG. 9 (b) can be displayed.

The second region 502 can be shifted to another location in the first region 501 so the user touches & drags a random region in the second region 502. In addition, a size of the second region 502 can be adjusted so the user touches two points of an outer frame of the second region 502 and then drags the touched points in and out.

According to the above-described embodiment, a user can apply each setting condition to a second image manually. Moreover, a plurality of preset images created from applying a plurality of setting conditions are displayed by being enumerated. Therefore, user's convenience can be enhanced.

Figure 10:
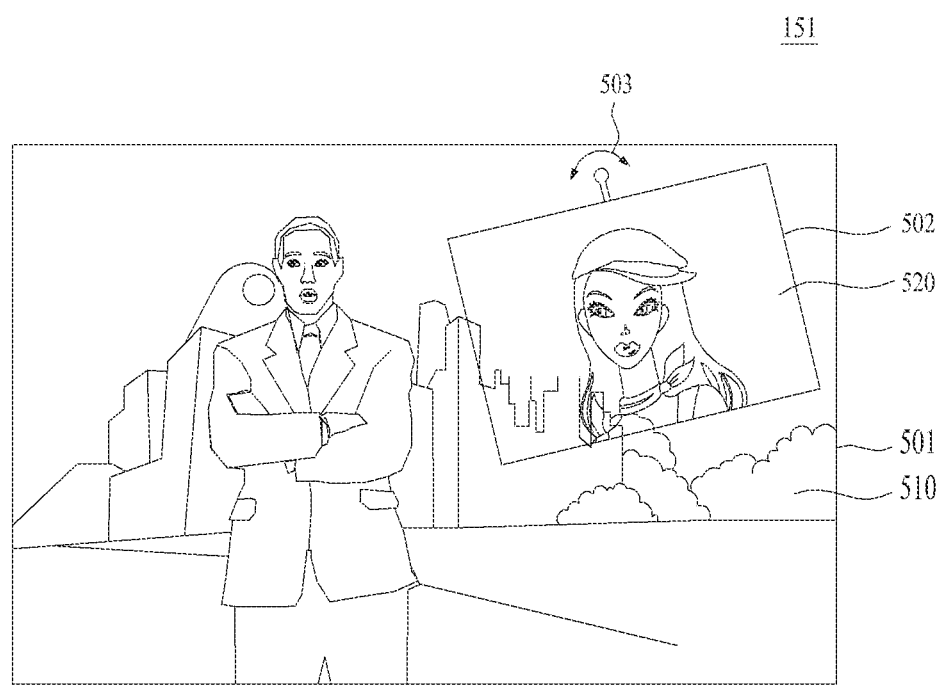
FIG. 10 is a diagram illustrating one example of a first image and a second image displayed on a screen of a mobile terminal according to one embodiment of the present invention.

Next, FIG. 10 is a diagram illustrating one example of a first image and a second image displayed on a screen of a mobile terminal according to one embodiment of the present invention. Referring to FIG. 10, the display 151 of the mobile terminal 100 displays a first image 510 obtained by the first camera and a second image 520 obtained by the second camera. In this instance, the second image 520 may include an image obtained by the second camera through 1-time photographing or a specific image selected by a user from a plurality of second images obtained by the second camera through multiple photographing operations.

When a user long presses a random region of the second image 520 over a prescribed time, an indicator 503 for adjusting a rotation angle of the second image can be displayed. If a command for a touch over a prescribed time is received through the user input unit, the controller 180 of the mobile terminal 100 can control the display unit to display the indicator 503 within or around the second image 520. While the indicator 503 is touched, if the user drags the indicator 503 clockwise or counterclockwise, the rotation angle of the second image can be arbitrarily adjusted.

According to an embodiment, each of the first image 510 and the second image 520 may include a preview image. In particular, the display 151 of the mobile terminal 100 displays a first preview image 510 obtained by the first camera in preview mode on a first preview region 501 and also displays a second preview image 520 obtained by the second camera in preview mode on a second preview region 502. If a touch command for touching the second preview region 502 over a prescribed time is received, the controller 180 of the mobile terminal 100 can control the display 151 to display the indicator 503 around the second preview region 502.

Figure 11:
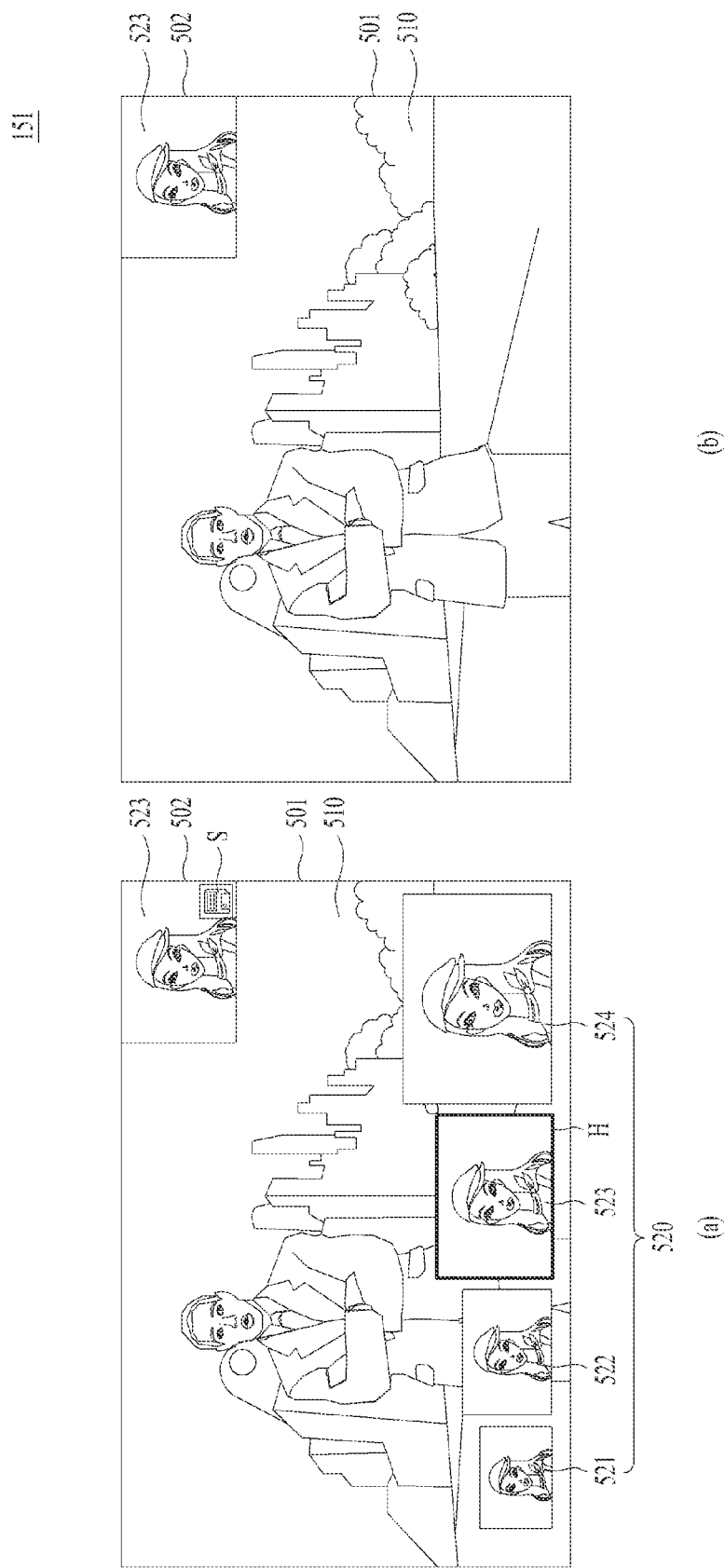
FIG. 11 is a diagram illustrating another example of a first image and a preset image displayed on a screen of a mobile terminal according to one embodiment of the present invention.

FIG. 11 is a diagram illustrating another example of a first image and a preset image displayed on a screen of a mobile terminal according to one embodiment of the present invention. Referring to FIG. 11, the display 151 of the mobile terminal 100 displays a first image 510 obtained by the first camera and a plurality of preset images 520. In this instance, a plurality of the preset images 520 mean the images created from applying a plurality of setting conditions to a second image obtained by the second camera through 1-time photographing or a specific image selected by a user from a plurality of second images obtained by the second camera through multiple photographing operations. In this instance, the setting condition may inclusively mean photo editing functions of all types (e.g., contrast, brightness, chroma, atmosphere, image size, image inclination, etc.) provided to the mobile terminal 100.

A plurality of the preset images 520 may include a first preset image 521 created from applying a first setting condition to the second image obtained by the second camera, a second preset image 522 created from applying a second setting condition to the second image obtained by the second camera, a third preset image 523 created from applying a third setting condition to the second image obtained by the second camera, a fourth preset image 524 created from applying a fourth setting condition to the second image obtained by the second camera, and the like. The number of the preset images may vary depending on an embodiment and no limitation is put on the number of the preset images. In addition, a type of the setting condition can be determined by a user in advance.

For instance, the first preset image 521 may include the image created from applying a first enlargement/reduction ratio to the second image, the second preset image 522 may include the image created from applying a second enlargement/reduction ratio to the second image, the third preset image 523 may include the image created from applying a third enlargement/reduction ratio to the second image, and the fourth preset image 524 may include the image created from applying a fourth enlargement/reduction ratio to the second image.

A plurality of the preset images 520 can be displayed by overlaying the first image 510. A plurality of the preset images 520 can be enumerated as thumbnail images on the first image 510, respectively. A user can select a prescribed desired preset image 523 from a plurality of the preset images 520 for example. For instance, the user can select a desired preset image from a plurality of the preset images 520 by touching the corresponding preset image.

The first image 510 can be displayed on a first region 501 of a screen of the display 151 of the mobile terminal 100 and the third preset image 523 selected by the user can be displayed on a second region 502 of the screen of the display 151 of the mobile terminal 100.

A highlight region H can be displayed on an outline of the prescribed preset image (e.g., the preset image 523) selected by the user from a plurality of the preset images 520. For instance, if the user selects the third preset image 523 located in the third place from a plurality of the preset images 520, the highlight region H is displayed around the selected third preset image 523 and the same image of the selected third preset image 523 can be displayed on the second region 502. In some instances, before the user selects a prescribed image from a plurality of the preset images 520, it can implement the mobile terminal 100 so the same image of the first preset image 521 enumerated in the first place among a plurality of the preset images 520 can be displayed on the second region 502.

If the user selects a save button S located in the second region 502, the third preset image 523 located in the second region 502 can be saved in the memory and the rest of the preset images 521, 522, 524 . . . can be removed from the screen, whereby a screen shown in FIG. 11 (b) can be displayed.

The second region 502 can be shifted to another location in the first region 501 so the user touches & drags a random region in the second region 502. In addition, a size of the second region 502 can be adjusted so the user touches two points of an outer frame of the second region 502 and then drags the touched points in and out.

According to the above-described embodiment, a user can apply each setting condition to a second image manually. Moreover, a plurality of preset images created from applying a plurality of setting conditions are displayed by being enumerated. Therefore, user's convenience can be enhanced.

Figure 12:
FIG. 12 is a diagram illustrating one example of a first image and a second image displayed on a screen of a mobile terminal according to one embodiment of the present invention.

FIG. 12 is a diagram illustrating one example of a first image and a second image displayed on a screen of a mobile terminal according to one embodiment of the present invention.

Referring to FIG. 12, the display 151 of the mobile terminal 100 displays a first image 510 obtained by the first camera and a second image 520 obtained by the second camera. In this instance, the second image 520 may include an image obtained by the second camera through 1-time photographing or a specific image selected by a user from a plurality of second images obtained by the second camera through multiple photographing operations.

The first image 510 can be displayed on a first region 501 of a screen of the display 151 of the mobile terminal 100 and the second image 520 can be displayed on a second region 502 of the screen of the display 151 of the mobile terminal 100. The second region 502 can be shifted to another location in the first region 501 so the user touches & drags a random region in the second region 502. In addition, a size of the second region 502 can be adjusted so the user touches two points of an outer frame of the second region 502 and then drags the touched points in and out.

The display 151 of the mobile terminal 100 can display an editing button $E_1$ and an editing button $E_2$ in the first region 501 and the second region 502, respectively. A user can edit the first image 510 by selecting the editing button $E_1$ in the first region 501. In addition, the user can edit the second image 520 by selecting the editing button $E_2$ in the second region 502.

According to an embodiment of the present invention, each of the first image 510 and the second image 520 can be individually edited. Therefore, user's convenience can be enhanced.

Figure 13:
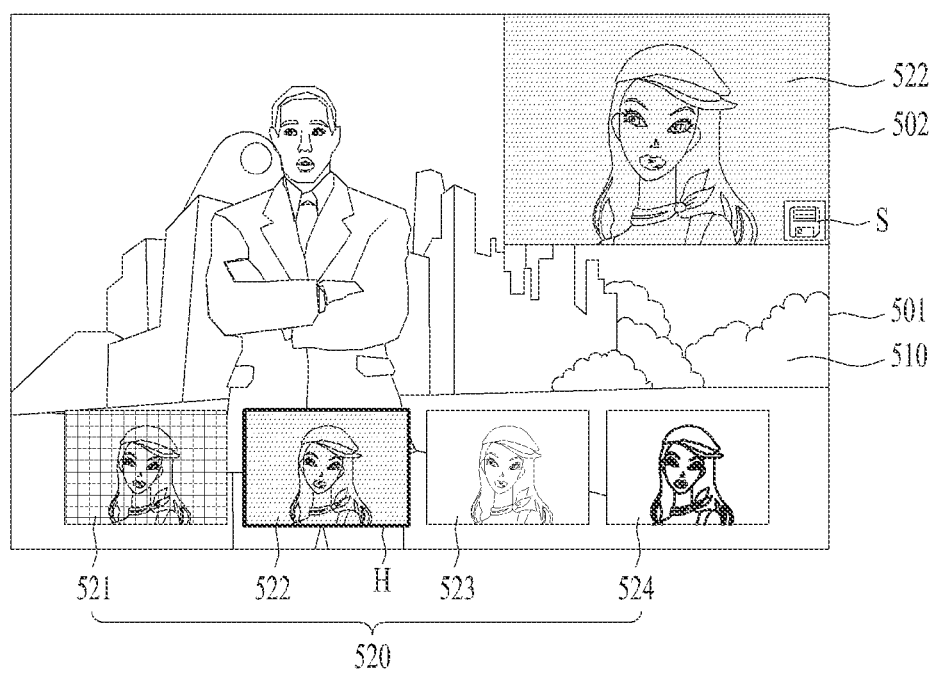
FIG. 13 is a diagram illustrating one example of a screen in editing mode of a second image in a mobile terminal according to one embodiment of the present invention.

FIG. 13 is a diagram illustrating one example of a screen in editing mode of a second image in a mobile terminal according to one embodiment of the present invention. For instance, a screen shown in FIG. 13 may include a screen after the editing button $E_2$ of the end image 520 has been selected in FIG. 12.

Referring to FIG. 13, the display 151 of the mobile terminal 100 displays a first image 510 obtained by the first camera and a plurality of preset images 520. In this instance, a plurality of the preset images 520 mean the images created from applying a plurality of setting conditions to a second image obtained by the second camera through 1-time photographing or a specific image selected by a user from a plurality of second images obtained by the second camera through multiple photographing operations. In this instance, the setting condition may inclusively mean photo editing functions of all types (e.g., contrast, brightness, chroma, atmosphere, image size, image inclination, etc.) provided to the mobile terminal 100.

A plurality of the preset images 520 may include a first preset image 521 created from applying a first setting condition to the second image obtained by the second camera, a second preset image 522 created from applying a second setting condition to the second image obtained by the second camera, a third preset image 523 created from applying a third setting condition to the second image obtained by the second camera, a fourth preset image 524 created from applying a fourth setting condition to the second image obtained by the second camera, and the like.

The number of the preset images may vary depending on an embodiment and no limitation is put on the number of the preset images. In addition, a type of the setting condition can be determined by a user in advance. Each of the first to fourth setting conditions may include a condition resulting from applying a combination of a plurality of functions included in the photo editing condition. For instance, the first setting condition may include a condition of changing the contrast, chroma and atmosphere in the second image.

A plurality of the preset images 520 may include an image that shows a history of the second image edited by the user until now. The user creates a plurality of preset images by applying at least one editing function to the second image, saves a plurality of the created preset images temporarily, and then controls a plurality of the preset images at a time using the editing history function. Hence, the user can recognize the editing history for the corresponding time at a glance. In addition, the mobile terminal 100 can display a separate menu button for selecting the editing history function on the display unit.

A plurality of the preset images 520 can be displayed by overlaying the first image 510. A plurality of the preset images 520 can be enumerated as thumbnail images on the first image 510, respectively. A user can select a prescribed desired preset image 522 from a plurality of the preset images 520 for example. For instance, the user can select a desired preset image from a plurality of the preset images 520 by touching the corresponding preset image.

The first image 510 can be displayed on a first region 501 of a screen of the display 151 of the mobile terminal 100 and the second preset image 522 selected by the user can be displayed on a second region 502 of the screen of the display 151 of the mobile terminal 100.

A highlight region H can be displayed on an outline of the prescribed preset image (e.g., the preset image 522) selected by the user from a plurality of the preset images 520. For instance, if the user selects the second preset image 522 located in the second place from a plurality of the preset images 520, the highlight region H is displayed around the selected second preset image 522 and the same image of the selected second preset image 522 can be displayed on the second region 502. In some instances, before the user selects a prescribed image from a plurality of the preset images 520, it can implement the mobile terminal 100 so the same image of the first preset image 521 enumerated in the first place among a plurality of the preset images 520 can be displayed on the second region 502.

If the user selects a save button S located in the second region 502, the second preset image 522 located in the second region 502 can be saved in the memory and the rest of the preset images 521, 523 and 524 can be removed from the screen.

Meanwhile, according to an embodiment of the present invention, an object is extracted from a first image obtained by a first camera, an object is extracted from a second image obtained by a second camera, and a size of each of the extracted objects can be adjusted. This is described with reference to FIGS. 14 and 15 as follows.

Figure 14:
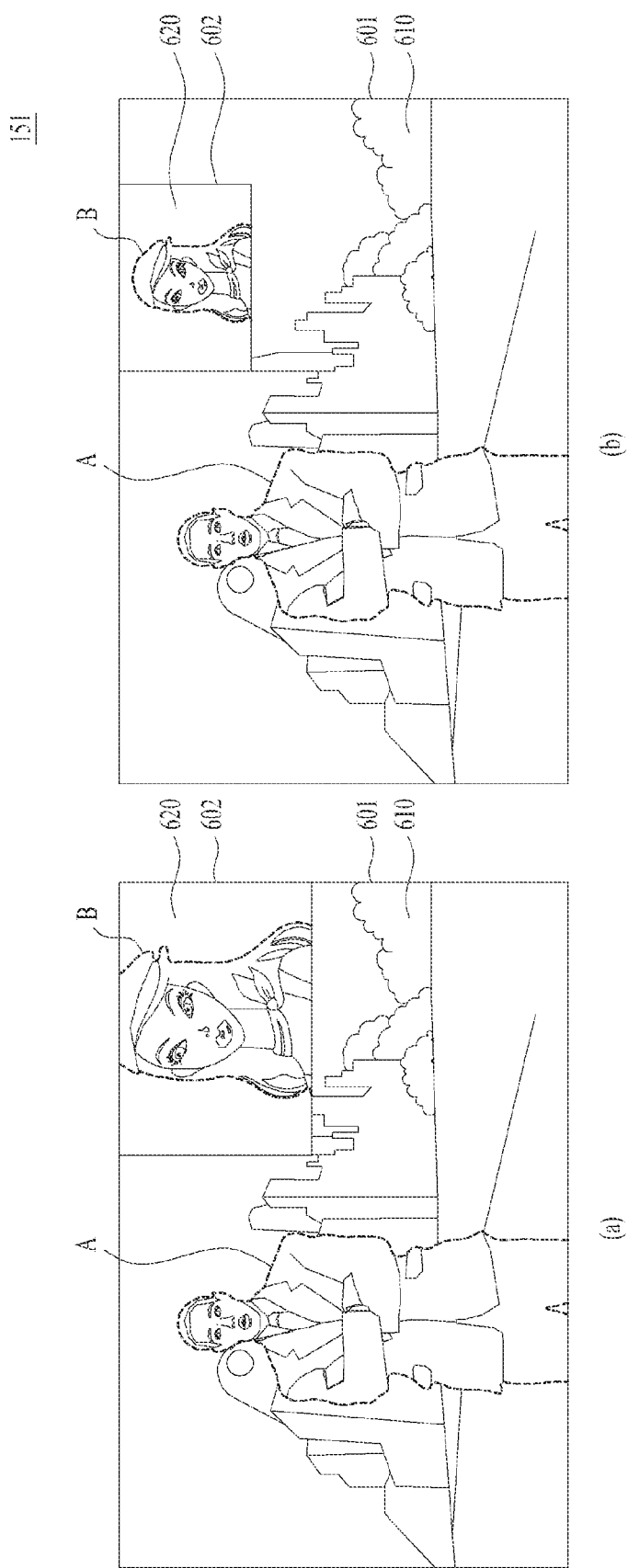
FIG. 14 is a diagram illustrating one example of a first image and a second image displayed on a screen of a mobile terminal according to one embodiment of the present invention.

FIG. 14 is a diagram illustrating one example of a first image and a second image displayed on a screen of a mobile terminal according to one embodiment of the present invention.

Referring to FIG. 14 (a), the display 151 of the mobile terminal 100 displays a first image 610 obtained by the first camera and a second image 620 obtained by the second camera. In this instance, the second image 620 may include an image obtained by the second camera through 1-time photographing or a specific image selected by a user from a plurality of second images obtained by the second camera through multiple photographing operations.

The first image 610 can be displayed on a first region 601 of a screen of the display 151 of the mobile terminal 100 and the second image 620 can be displayed on a second region 602 of the screen of the display 151 of the mobile terminal 100. The second region 602 can be shifted to another location in the first region 601 so the user touches & drags a random region in the second region 602. In addition, a size of the second region 602 can be adjusted so the user touches two points of an outer frame of the second region 602 and then drags the touched points in and out.

The controller 180 of the mobile terminal 100 extracts a first object A from the first image 610 and also extracts a second object B from the second image 620. When a plurality objects exist in the first image 610, the controller 180 can select a most clearly focused object as the first object A. When the controller 180 of the mobile terminal 100 extracts a plurality of objects from the first image 610, the controller 180 can determine at least one object selected by a user as the first object A.

Referring to FIG. 14 (b), the controller 180 of the mobile terminal 100 can adjust a size of the second object B in accordance with a size of the first object A. For instance, the controller 180 of the mobile terminal 100 detects a width of a face region in the first object A and can then control a size of the second object B to be adjusted overall so a width of a face region of the second object B belongs to a prescribed range of the width of the face region of the first object A. In addition, the size of the second object B can be adjusted by a size adjustment of the second image 620 itself.

According to the above-described embodiment, by adjusting sizes of the first object A and the second object B to belong to a similar range, the first image 610 and the second image 620 can be synthesized together more naturally.

According to an embodiment, each of the first image 610 and the second image 620 may include a preview image. In particular, the display 151 of the mobile terminal 100 displays a first preview image 610 obtained by the first camera in preview mode on a first preview region 601 and also displays a second preview image 620 obtained by the second camera in preview mode on a second preview region 602. The mobile terminal 100 may extract a focused region or a user-touched region as a first object A from the first preview image 610 and may extract a focused region or a user-touched region as a second object B from the second preview image 620. Subsequently, the mobile terminal 100 can adjust a size of the second object B in accordance with a size of the first object A.

Figure 15:
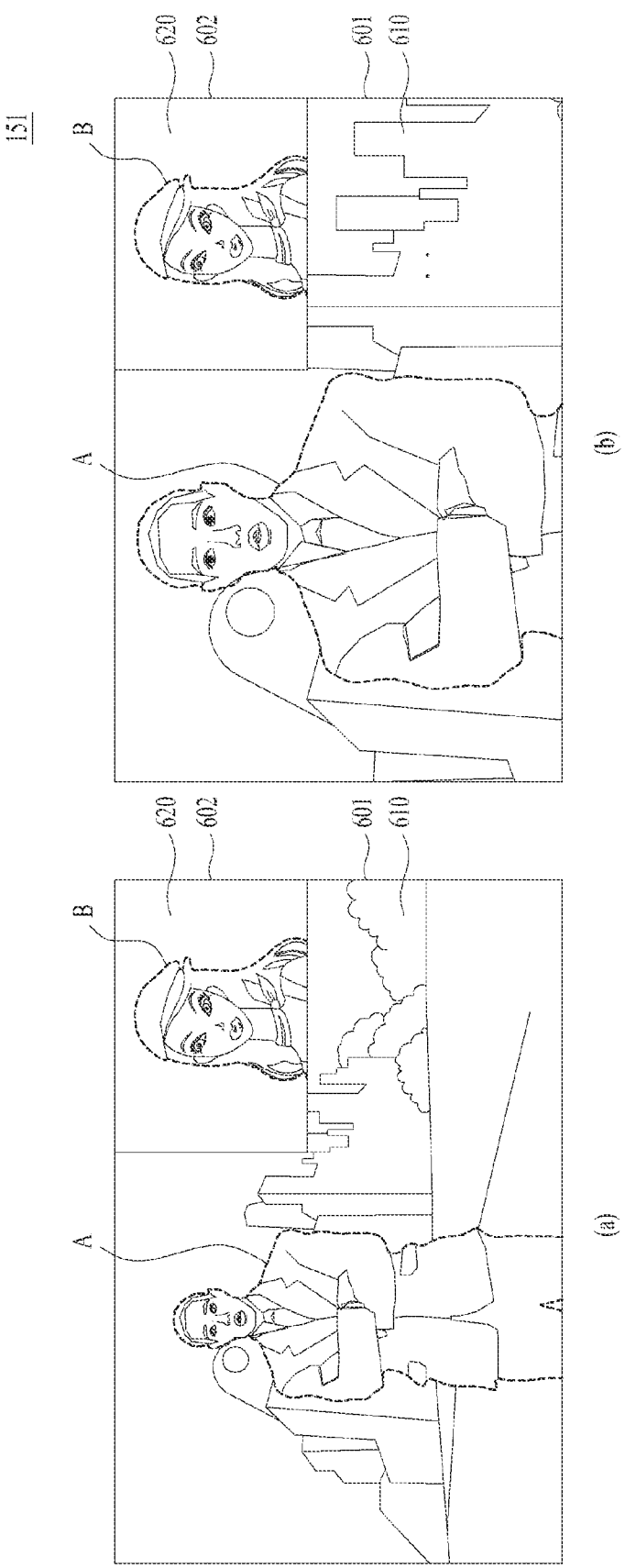
FIG. 15 is a diagram illustrating one example of a first image and a second image displayed on a screen of a mobile terminal according to one embodiment of the present invention.

FIG. 15 is a diagram illustrating another example of a first image and a second image displayed on a screen of a mobile terminal according to one embodiment of the present invention. Referring to FIG. 15 (a), the display 151 of the mobile terminal 100 displays a first image 610 obtained by the first camera and a second image 620 obtained by the second camera. In this instance, the second image 620 may include an image obtained by the second camera through 1-time photographing or a specific image selected by a user from a plurality of second images obtained by the second camera through multiple photographing operations.

The first image 610 can be displayed on a first region 601 of a screen of the display 151 of the mobile terminal 100 and the second image 620 can be displayed on a second region 602 of the screen of the display 151 of the mobile terminal 100. The second region 602 can be shifted to another location in the first region 601 so the user touches & drags a random region in the second region 602. In addition, a size of the second region 602 can be adjusted so the user touches two points of an outer frame of the second region 602 and then drags the touched points in and out.

The controller 180 of the mobile terminal 100 extracts a first object A from the first image 610 and also extracts a second object B from the second image 620. When a plurality objects exist in the first image 610, the controller 180 can select a most clearly focused object as the first object A. When the controller 180 of the mobile terminal 100 extracts a plurality of objects from the first image 610, the controller 180 can determine at least one object selected by a user as the first object A.

Referring to FIG. 15 (b), the controller 180 of the mobile terminal 100 can adjust a size of the first object A in accordance with a size of the second object B. For instance, the controller 180 of the mobile terminal 100 detects a width of a face region in the second object B and can then control a size of the first object A to be adjusted overall so a width of a face region of the first object A belongs to a prescribed range of the width of the face region of the second object B. In addition, the size of the first object A can be adjusted by controlling the first image 610 to zoom in or out.

According to the above-described embodiment, by adjusting sizes of the first object A and the second object B to belong to a similar range, the first image 610 and the second image 620 can be synthesized together more naturally.

According to an embodiment, each of the first image 610 and the second image 620 may include a preview image. In particular, the display 151 of the mobile terminal 100 displays a first preview image 610 obtained by the first camera in preview mode on a first preview region 601 and also displays a second preview image 620 obtained by the second camera in preview mode on a second preview region 602. The mobile terminal 100 may extract a focused region or a user-touched region as a first object A from the first preview image 610 and may extract a focused region or a user-touched region as a second object B from the second preview image 620. Subsequently, the mobile terminal 100 can adjust a size of the first object A in accordance with a size of the second object B.

According to an embodiment of the present invention, a second object is extracted from a second image obtained by a second camera and the extracted object can be synthesized with a first image obtained by a first camera only. This is described in detail with reference to FIGS. 16 to 22 as follows.

Figure 16:
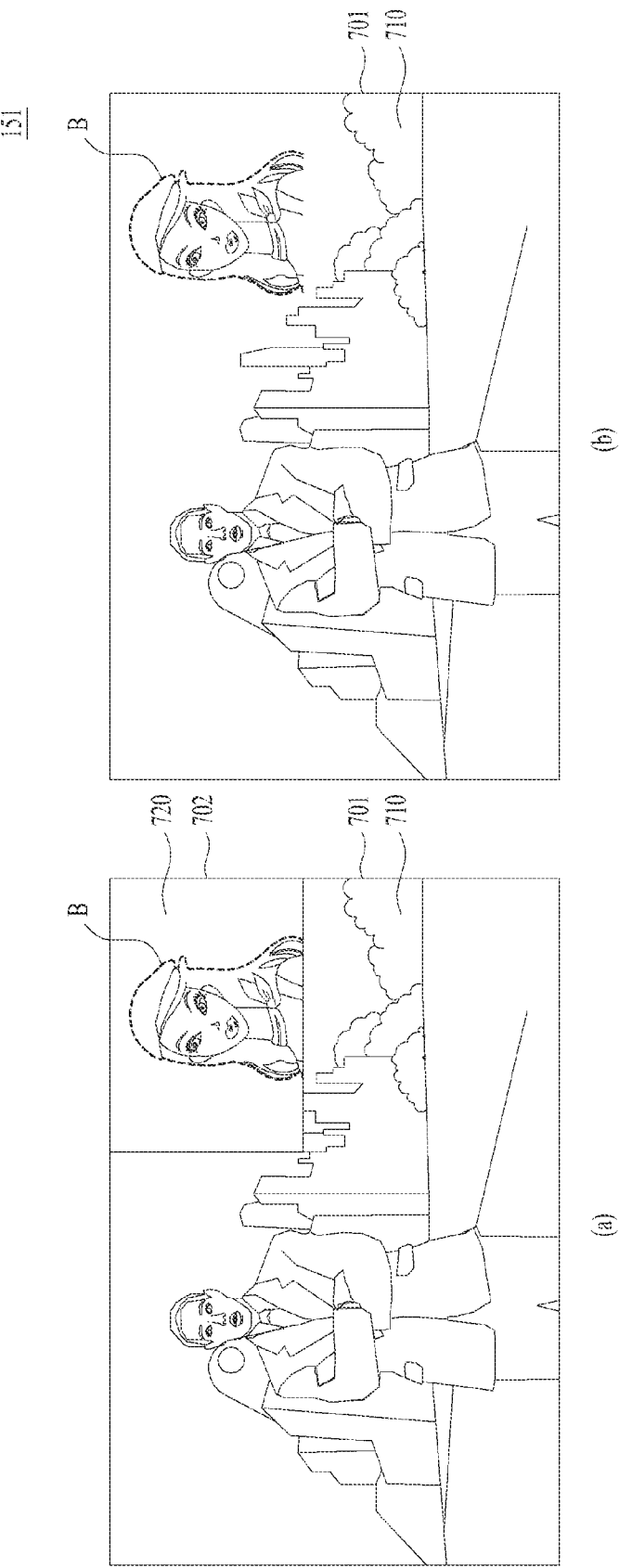
FIG. 16 is a diagram illustrating one example of a first image and a second object displayed on a screen of a mobile terminal according to one embodiment of the present invention.

FIG. 16 is a diagram illustrating one example of a first image and a second object displayed on a screen of a mobile terminal according to one embodiment of the present invention. Referring to FIG. 16 (a), the display 151 of the mobile terminal 100 displays a first image 710 obtained by the first camera and a second image 720 obtained by the second camera. In this instance, the second image 720 may include an image obtained by the second camera through 1-time photographing or a specific image selected by a user from a plurality of second images obtained by the second camera through multiple photographing operations.

The first image 710 can be displayed on a first region 701 of a screen of the display 151 of the mobile terminal 100 and the second image 720 can be displayed on a second region 702 of the screen of the display 151 of the mobile terminal 100. The second region 702 can be shifted to another location in the first region 701 so the user touches & drags a random region in the second region 702. In addition, a size of the second region 702 can be adjusted so the user touches two points of an outer frame of the second region 702 and then drags the touched points in and out.

The controller 180 of the mobile terminal 100 extracts a second object B from the second image 720. In addition, referring to FIG. 16 (b), the display 151 of the mobile terminal 100 displays the first image 710 and the extracted second image B. In addition, the second object B can be displayed by overlaying the first image 710.

The second object B can be shifted to another location in the first region 701 so the user touches & drags a random region in the second object B. In addition, a size of the second object B can be adjusted so the user touches two points of an outer frame of the second object B and then drags the touched points in and out.

According to the above-described embodiment, the second object B is extracted from the second image 720 only and then displayed by overlaying the first image 710, whereby the first image 710 and the second object B can be synthesized together more naturally. According to an embodiment, when the first image 710 obtained by the first camera and the second image 720 obtained by the second camera are displayed, referring to FIG. 16 (b), the mobile terminal 100 can be implemented so the first image 710 and the second object B are displayed only from the beginning.

According to an embodiment, each of the first image 710 and the second image 720 may include a preview image. In particular, the mobile terminal 100 can display a first preview image 710 obtained by the first camera in preview mode on a first preview region 701 and can also display a second preview image 720 obtained by the second camera in preview mode on a second preview region 702. The mobile terminal 100 may extract a focused region or a user-touched region as a second object B from the second preview image 720. Thereafter, the mobile terminal 100 can display the first preview image 710 and the second object B. Alternatively, according to an embodiment, the mobile terminal 100 can be implemented so only the first preview image 710 and the second object B are displayed from the beginning of the preview mode.

Figure 17:
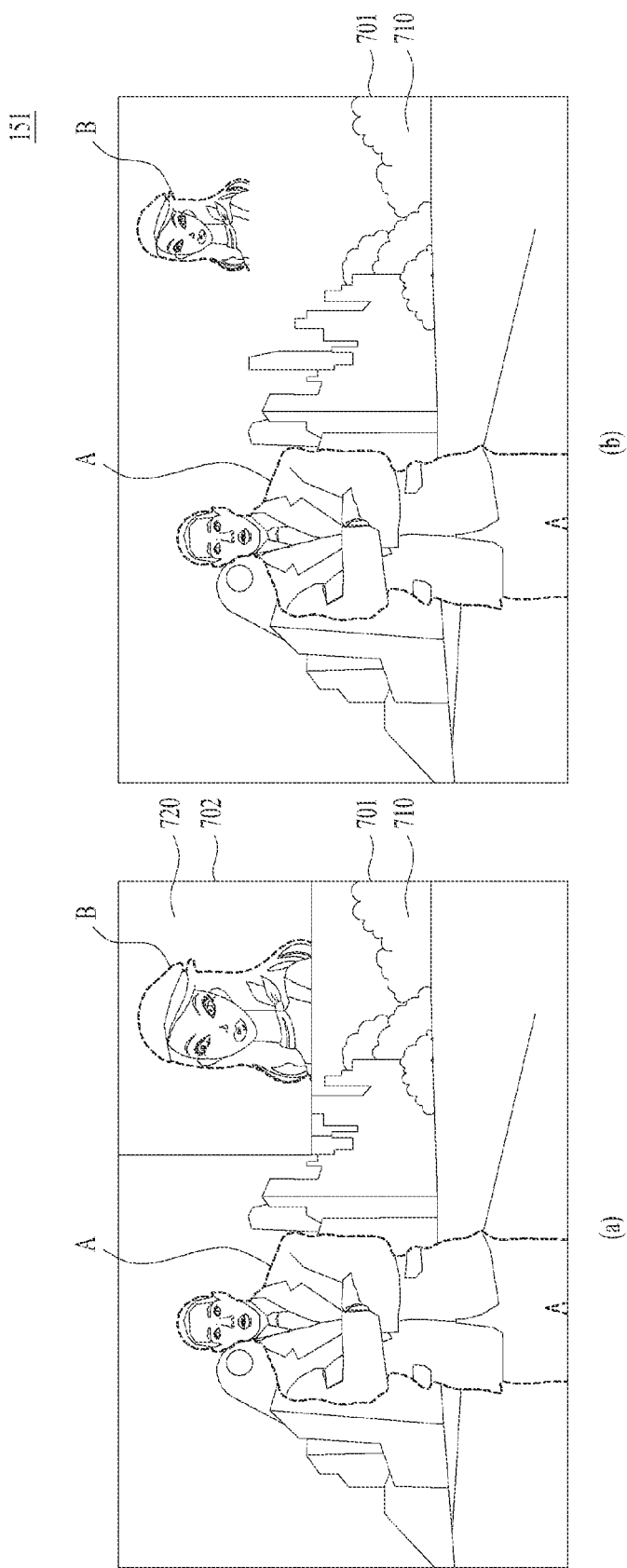
FIG. 17 is a diagram illustrating another example of a first image and a second object displayed on a screen of a mobile terminal according to one embodiment of the present invention.

FIG. 17 is a diagram illustrating another example of a first image and a second object displayed on a screen of a mobile terminal according to one embodiment of the present invention. Referring to FIG. 17 (a), the display 151 of the mobile terminal 100 displays a first image 710 obtained by the first camera and a second image 720 obtained by the second camera. In this instance, the second image 720 may include an image obtained by the second camera through 1-time photographing or a specific image selected by a user from a plurality of second images obtained by the second camera through multiple photographing operations.

The first image 710 can be displayed on a first region 701 of a screen of the display 151 of the mobile terminal 100 and the second image 720 can be displayed on a second region 702 of the screen of the display 151 of the mobile terminal 100. The second region 702 can be shifted to another location in the first region 701 so the user touches & drags a random region in the second region 702. In addition, a size of the second region 702 can be adjusted so the user touches two points of an outer frame of the second region 702 and then drags the touched points in and out.

The controller 180 of the mobile terminal 100 extracts a first object A from the first image 710 and also extracts a second object B from the second image 720. When a plurality objects exist in the first image 710, the controller 180 can select a most clearly focused object as the first object A. When the controller 180 of the mobile terminal 100 extracts a plurality of objects from the first image 710, the controller 180 can determine at least one object selected by a user as the first object A.

Further, referring to FIG. 17 (b), the display 151 of the mobile terminal 100 displays the first image 710 and the extracted second image B. In addition, the second object B can be displayed by overlaying the first image 710. In this instance, the controller 180 of the mobile terminal 100 can adjust a size of the second object B in accordance with a size of the first object A. Alternatively, the controller 180 of the mobile terminal 100 can adjust a size of the first object A in accordance with a size of the second object B. For instance, the controller 180 of the mobile terminal 100 detects a width of a face region in the first object A and can then control a size of the second object B to be adjusted overall so a width of a face region of the second object B belongs to a prescribed range of the width of the face region of the first object A.

In another instance, the controller 180 of the mobile terminal 100 detects a width of a face region in the second object B and can then control a size of the first object A to be adjusted overall so a width of a face region of the first object A belongs to a prescribed range of the width of the face region of the second object B. In addition, the size of the first object A can be adjusted by controlling the first image 710 to zoom in or out. The second object B can be shifted to another location in the first region 701 so the user touches & drags a random region in the second object B. In addition, a size of the second object B can be adjusted so the user touches two points of an outer frame of the second object B and then drags the touched points in and out.

According to the above-described embodiment, the second object B is extracted from the second image 720 only and then displayed by overlaying the first image 710. Simultaneously, the size of the first object A and the size of the second object B are adjusted to belong to a similar range. Therefore, the first image 710 and the second object B can be synthesized together more naturally.

According to an embodiment, when the first image 710 obtained by the first camera and the second image 720 obtained by the second camera are displayed, referring to FIG. 17 (b), the mobile terminal 100 can be implemented so the first image 710 and the second object B are displayed only from the beginning while the size of the first object A and the size of the second object B are adjusted to belong to a similar range.

According to an embodiment, each of the first image 710 and the second image 720 may include a preview image. Because the description of each of the first image 710 and the second image 720 includes the preview image is similar to the former description with reference to FIGS. 14 to 16, its details are omitted from the following description.

Figure 18:
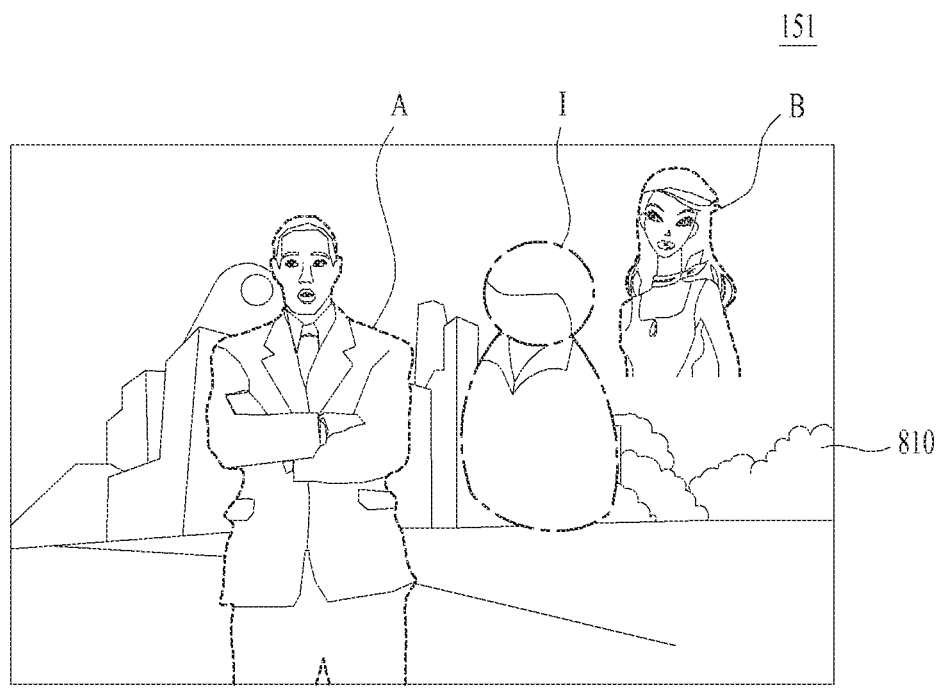
FIG. 18 and FIG. 19 are diagrams illustrating examples of a first image, a second object and an indicator displayed on a screen of a mobile terminal according to one embodiment of the present invention.
Figure 19:
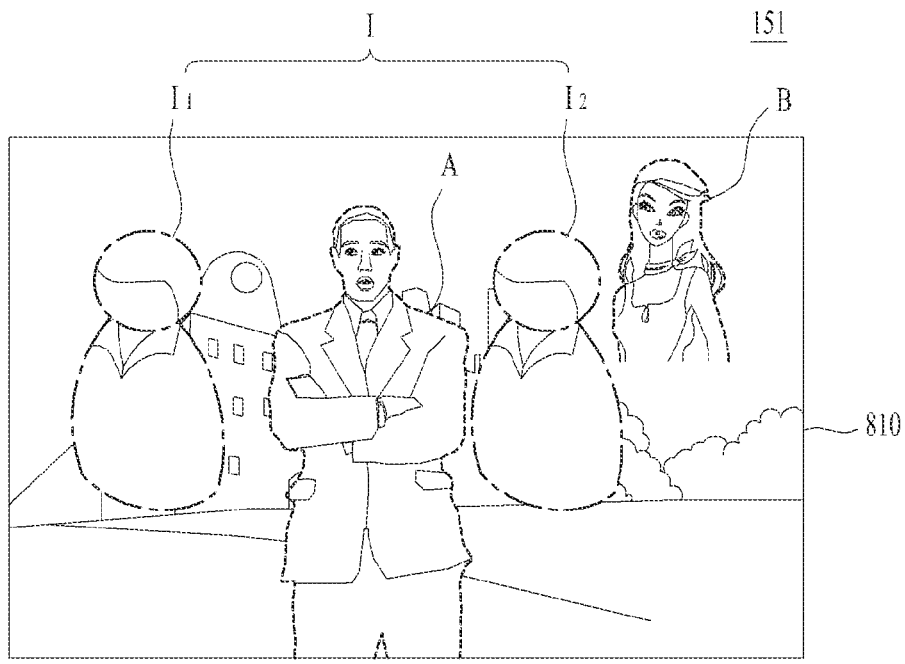

FIGS. 18 and 19 are diagrams illustrating examples of a first image, a second object and an indicator displayed on a screen of a mobile terminal according to one embodiment of the present invention. Referring to FIGS. 18 and 19, the display 151 of the mobile terminal 100 displays a first image 810 obtained by the first camera and a second object B in a second image obtained by the second camera. The following descriptions with reference to FIGS. 18 and 19 assume the controller 180 of the mobile terminal 100 extracts a first object A and a second object B from the first image 810 and the second image, respectively and theft controls at least one portion of the second object B to be displayed by overlying the first image 810. According to an embodiment, the controller 180 of the mobile terminal 100 controls sizes of the first and second objects A and B to belong to a similar range and can display the adjusted objects on the display 151.

The controller 180 of the mobile terminal 100 can detect location information of the first object A. In this instance, the location information of the first object A includes information indicating where the first object A is located within the first image. For instance, the location information of the first object A may mean information indicating that the first object A inclines toward which one of top, bottom, left and right parts in the first image 810, information indicating how much vacant space exists in top/bottom/left/right part of the first object A, or the like.

Based on the result of the detection of the first object A, the controller 180 of the mobile terminal 100 can control the display 151 to display at least one indicator I indicating at least one candidate region at which the second object B will be located in the first image 810. Alternatively, based on the result of the detection of the first object A and the size of the second object B, the controller 180 of the mobile terminal 100 can control the display 151 to display at least one indicator I indicating each of at least one candidate region at which the second object B will be located in the first image 810.

Based on the result of the defection of the first object A, if there is one candidate region suitable for the second object B to be located in the first image 810, referring to FIG. 18, the controller 180 of the mobile terminal 100 can control the display 151 to display one indicator I. Alternatively, based on the result of the detection of the first object A, if there are at least two candidate regions suitable for the second object B to be located in the first image 810, referring to FIG. 19, the controller 180 of the mobile terminal 100 can control the display 151 to display at least two indicators $I_1$ and $I_2$.

If one of the at least one indicator I is selected, the controller 180 of the mobile terminal 100 can control the display 151 to display the second object B on the candidate region indicated by the selected indicator I so the second object B overlays the first image 810.

According to the above-mentioned embodiment, as a candidate region for enabling the second object B to be synthesized more naturally in the first image 810 is proposed to a user, user's convenience can be enhanced. Of course, it is unnecessary for the user to enable the second object B to be located at the candidate region indicated by the indicator I. Instead, the user touches & drags a random region of the second object B in order to freely change a location of the second object B in the first image 810. According to an embodiment, each of the first image 810 and the second object B may include a preview image.

Figure 20:
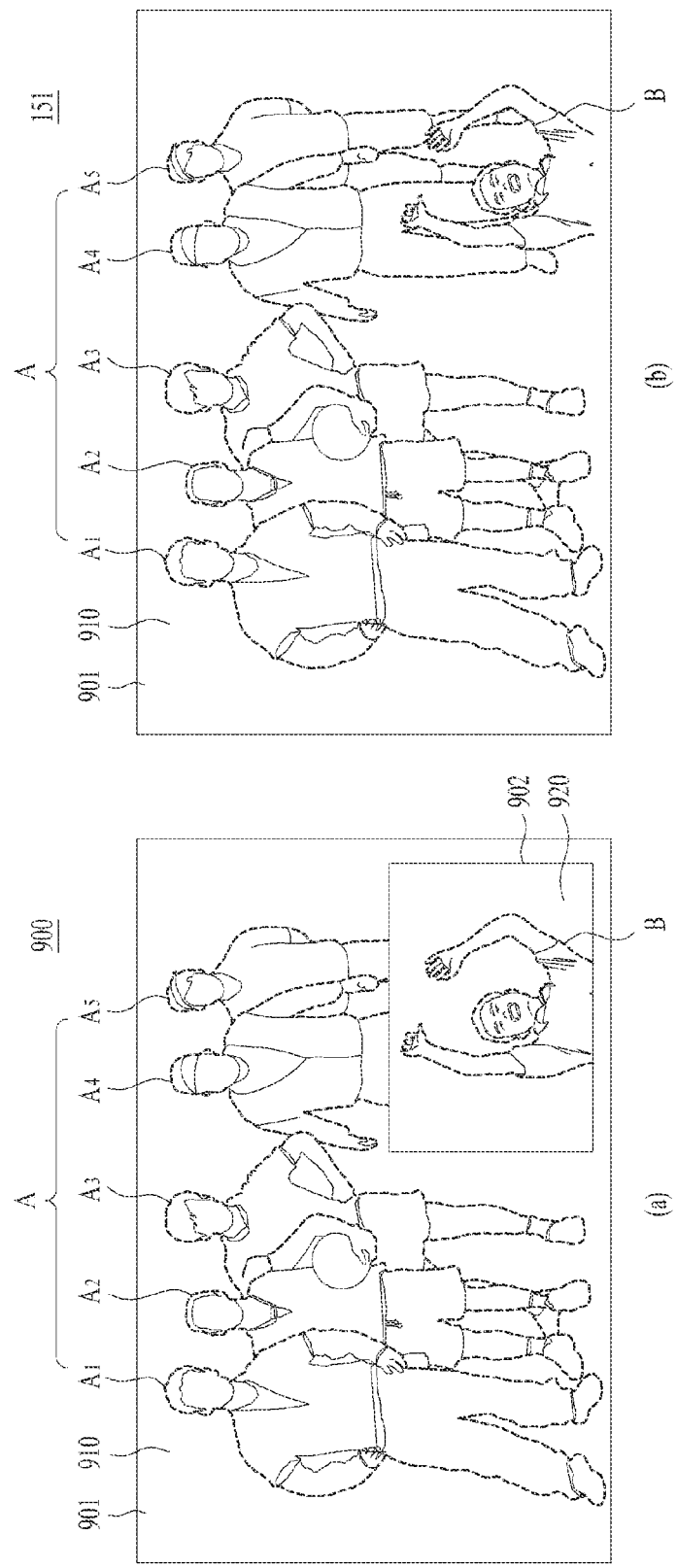
FIG. 20 is a diagram illustrating one example of a first image and a second object displayed on a screen of a mobile terminal according to one embodiment of the present invention.

FIG. 20 is a diagram illustrating one example of a first image and a second object displayed on a screen of a mobile terminal according to one embodiment of the present invention. Referring to FIG. 20 (a), the display 151 of the mobile terminal 100 displays a first image 910 obtained by the first camera and a second image 920 obtained by the second camera. In this instance, the second image 920 may include an image obtained by the second camera through 1-time photographing or a specific image selected by a user from a plurality of second images obtained by the second camera through multiple photographing operations.

The first image 910 can be displayed on a first region 901 of a screen of the display 151 of the mobile terminal 100 and the second image 920 can be displayed on a second region 902 of the screen of the display 151 of the mobile terminal 100. The second region 902 can be shifted to another location in the first region 901 so the user touches & drags a random region in the second region 902. In addition, a size of the second region 902 can be adjusted so the user touches two points of an outer frame of the second region 902 and then drags the touched points in and out.

The controller 180 of the mobile terminal 100 extracts a first object A from the first image 910 and also extracts a second object B from the second image 920. In this instance, the first object A may include a plurality of sub-objects $A_1$ to $A_5$. In particular, when a plurality of third parties a user of the mobile terminal 100 intends to photograph exist, a plurality of the sub-objects $A_1$ to $A_5$ may correspond to a plurality of persons, respectively.

In addition, referring to FIG. 20 (b), the display 151 of the mobile terminal 100 displays the first image 910 and the extracted second image B. In addition, the second object B can be displayed by overlaying the first image 910. In this instance, the controller 180 of the mobile terminal 100 can adjust a size of the second object B in accordance with a size of the first object A. Alternatively, the controller 180 of the mobile terminal 100 can adjust a size of the first object A in accordance with a size of the second object B. For instance, the controller 180 of the mobile terminal 100 detects a width of a face region of each of the sub-objects $A_1$ to $A_5$ in the first object A and can then control a size of the second object B to be adjusted overall so a width of a face region of the second object B belongs to a prescribed range of the width of the face region of each of the sub-objects $A_1$ to $A_5$.

In another instance, the controller 180 of the mobile terminal 100 detects a width of a face region in the second object B and can then control a size of the first object A to be adjusted overall so a width of a face region of each of the sub-objects $A_1$ to $A_5$ in the first object A belongs to a prescribed range of the width of the face region of the second object B. In addition, the size of the first object A can be adjusted by controlling the first image 910 to zoom in or out. In this instance, the width of the face region of each of the sub-objects $A_1$ to $A_5$ may mean an average of the widths of the face regions of the sub-objects $A_1$ to $A_5$.

The second object B can be shifted to another location in the first region 901 so a user touches & drags a random region in the second object B. In addition, a size of the second object B can be adjusted so the user touches two points of an outer frame of the second object B and then drags the touched points in and out.

According to the above-described embodiment, the second object B is extracted from the second image 920 only and then displayed by overlaying the first image 910. Simultaneously, the size of the first object A and the size of the second object B are adjusted to belong to a similar range. Therefore, the first image 910 and the second object B can be synthesized together more naturally.

According to an embodiment, when the first image 910 obtained by the first camera and the second image 920 obtained by the second camera are displayed, referring to FIG. 20 (b), the mobile terminal 100 can be implemented so the first image 910 and the second object B are displayed only from the beginning while the size of the first object A and the size of the second object B are adjusted to belong to a similar range. According to an embodiment, each of the first image 910 and the second image 920 may include a preview image.

Figure 21:
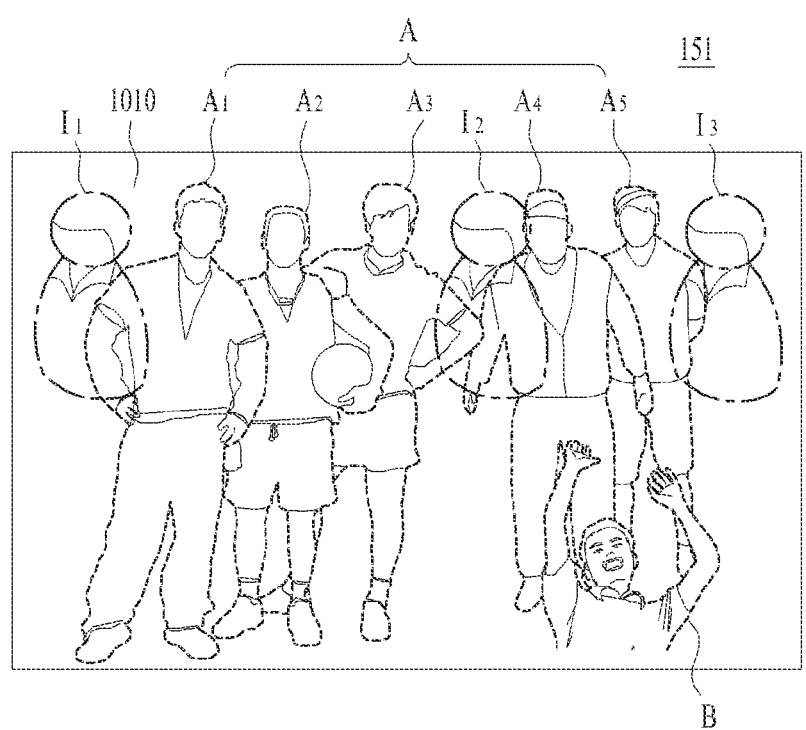
FIG. 21 is a diagram illustrating one example of a first image, a second object and an indicator displayed on a screen of a mobile terminal according to one embodiment of the present invention.

FIG. 21 is a diagram illustrating one example of a first image, a second object and an indicator displayed on a screen of a mobile terminal according to one embodiment of the present invention. Referring to FIG. 21, the display 151 of the mobile terminal 100 displays a first image 1010 obtained by the first camera and a second object B in a second image obtained by the second camera. The following description with reference to FIG. 21 assumes the controller 180 of the mobile terminal 100 extracts a first object A and a second object B from the first image 1010 and the second image, respectively and then controls at least one portion of the second object B to be displayed on the display 151 by overlying the first image 1010. The first object A may include a plurality of sub-objects $A_1$ to $A_5$. According to an embodiment, the mobile terminal 100 can display the first object A and the second object B by controlling sizes of the first and second objects A and B to belong to a similar range.

The controller 180 of the mobile terminal 100 can detect at least one of a size of each of a plurality of the sub-objects $A_1$ to $A_5$, a space between two (e.g., $A_1$ and $A_2$, $A_2$ and $A_3$, $A_3$ and $A_4$, and $A_4$ and $A_5$) of the sub-objects $A_1$ to $A_5$ adjacent to each other, and location information of each of a plurality of the sub-objects $A_1$ to $A_5$. In this instance, the location information of each of a plurality of the sub-objects $A_1$ to $A_5$ includes information indicating where each of the sub-objects $A_1$ to $A_5$ is located within the first image. For instance, the location information of each of a plurality of the sub-objects $A_1$ to $A_5$ may mean information indicating that each of the sub-objects $A_1$ to $A_5$ inclines toward which one of top, bottom, left and right parts in the first image 1010, information indicating how much vacant space exists in top/bottom/left/right part of each of the sub-objects $A_1$ to $A_5$, or the like.

Based on the result of the detection of the first object A, the controller 180 of the mobile terminal 100 can control the display 151 to display at least one indicator I indicating at least one candidate region at which the second object B will be located in the first image 1010. Alternatively, based on the result of the detection of the first object A and the size of the second object B, the controller 180 of the mobile terminal 100 can control the display 151 to display at least one indicator I indicating each of at least one candidate region at which the second object B will be located in the first image 1010. In the example shown in FIG. 21, 3 indicators $I_1$, $I_2$ and $I_3$ are displayed, by which the present invention is not limited.

If one of the at least one indicator I is selected, the controller 180 of the mobile terminal 100 can control the display 151 to display the second object B on the candidate region indicated by the selected indicator I so the second object B overlays the first image 1010. According to the above-mentioned embodiment, as a candidate region for enabling the second object B to be synthesized more naturally in the first image 1010 is proposed to a user, user's convenience can be enhanced. Of course, it is unnecessary for the user to enable the second object B to be located at the candidate region indicated by the indicator I. Instead, the user touches & drags a random region of the second object B in order to freely change a location of the second object B in the first image 1010. According to an embodiment, each of the first image 1010 and the second object B may include a preview image.

FIG. 22 is a diagram illustrating one example of a first image and a second object displayed on a screen of a mobile terminal according to one embodiment of the present invention. Referring to FIG. 22, the display 151 of the mobile terminal 100 displays a first image 1110 obtained by the first camera and a second object B in a second image obtained by the second camera.

The following description with reference to FIG. 22 assumes the controller 180 of the mobile terminal 100 extracts a first object A and a second object B from the first image 1110 and the second image, respectively and then controls at least one portion of the second object B to be displayed on the display 151 by overlying the first image 1010. The first object A may include a plurality of sub-objects $A_1$ to $A_5$. According to an embodiment, the mobile terminal 100 can display the first object A and the second object B by controlling sizes of the first and second objects A and B to belong to a similar range.

At least one portion of the second object B can be displayed by overlaying the first image 1110. If the at least one portion of the second object B is displayed by overlaying the first image, it may mean that the whole second object B can be displayed by overlaying the first image 1110 (FIG. 22 (a)) or that one portion of the second object B can be displayed by overlaying the first image 1110 while the rest of the second object B is not displayed (FIG. 22 (b)). In the latter case, in the image created from synthesizing the first image 1110 and the second object B together, the rest of the second object B does not appear.

When the first image 1110 is obtained using the first camera, the controller 180 of the mobile terminal 100 can obtain distance information of the first object A in the first image 1110. For instance, when the first image 1110 is obtained using the first camera, the distance sensing module 142 of the mobile terminal 100 can obtain distance information on the first object A corresponding to a focused region in a preview image displayed on a first preview region of the display 151 or a region having a screen touched by a user. In this instance, the distance information of the first object A means a distance to the first object A from the distance sensing module 142. When the first object A includes a plurality of sub-objects $A_1$ to $A_5$, the distance sensing module 142 can obtain distance information of each of a plurality of sub-objects $A_1$ to $A_5$.

The controller 180 of the mobile terminal 100 can control the obtained distance information to be saved in the memory 160 by being matched to the first object A. When the first object A includes a plurality of sub-objects $A_1$ to $A_5$, the controller 180 can control the distance information of a plurality of sub-objects $A_1$ to $A_5$ to be saved in the memory 160 by being matched to a plurality of sub-objects $A_1$ to $A_5$, respectively.

The controller 180 of the mobile terminal 100 can display a graphic interface G for receiving a distance setting command for setting a distance of the second object B. In this instance, the graphic interface G can play a role as the user input unit 130 configured to receive a distance setting command from a user.

If the distance setting command for setting the distance of the second object B is received through the graphic interface G, the controller 180 of the mobile terminal 100 can determine the order relationship between the end object B and the first object A adjacent to the second object B in accordance with the received distance setting command.

For instance, referring to FIG. 22 (a), assume that a user arranges the second object B to a left side of the first sub-object $A_1$ in the first object A. In this instance, the second object B is located to the left side of the first sub-object $A_1$ by overlapping a portion of the first sub-object $A_1$.

The user may randomly arrange the second object B to the left side of the first sub-object $A_1$. Alternatively, as mentioned in the foregoing description with reference to FIG. 22, the user may arrange the second object B in one of candidate regions indicated by the indicator I.

Subsequently, the user can set up a distance of the second object B by touching and dragging a pointer P in the graphic interface G right and left. The user adjusts a location of the pointer P on the graphic interface G, thereby being able to set the distance of the second object B in aspect of a relative distance between the distance sensing module 142 and the first object A. For instance, if the pointer P is located at 0 on the graphic interface G, the distance of the second object B is set to a distance closer from the distance sensing module 142 than a distance to the distance sensing module 142 from the first object A.

In another instance, if the pointer P is located at 100 on the graphic interface G, the distance of the second object B is set to a distance more distant from the distance sensing module 142 than a distance to the distance sensing module 142 from the first object A. For further instance, if the pointer P is located between 0 and 100 on the graphic interface G, the distance of the second object B is set to a distance between a distance to the distance sensing module 142 from the first sub-object $A_1$ closest to the distance sensing module 142 in the first object A and a distance to the distance sensing module 142 from the fifth sub-object $A_5$ farthest from the distance sensing module 142 in the first object A.

The user arranges the pointer P at a location close to 0 on the graphic interface G, thereby enabling the second object B to be located ahead of the first sub-object $A_1$ in aspect of the distance to the distance sensing module 142. In particular, if the distance setting command of the second object B is received, the mobile terminal 100 accesses distance information of a part (e.g., the first sub-object $A_1$) of the first object A contacting with the second object B from the memory and then determines the order relationship between the second object B and the first sub-object $A_1$ contacting with the second object B based on the accessed distance information.

In the case shown in FIG. 22 (a), the controller 180 of the mobile terminal 100 can determine the order relationship as the second object B is located ahead of the first sub-object $A_1$. In this instance, the controller 180 determines a range of the second Object B, which will overlay the first image 1110, in accordance with the determined order relationship. In FIG. 22 (a), it can determine that the whole range of the second object B overlays the first image 1110.

In another instance, referring to FIG. 22 (b), assume that a user arranges the second object B between the third sub-object $A_3$ and the fourth sub-object $A_4$ in the first object A. In this instance, a space between the third sub-object $A_3$ and the fourth sub-object $A_4$ means a horizontal aspect. The second object B is located between the third sub-object $A_3$ and the fourth sub-object $A_4$ so the third sub-object $A_3$ and the fourth sub-object $A_4$ overlap each other in part.

The user may randomly arrange the second object B, the third sub-object $A_3$ in the first object A and the fourth sub-object $A_4$ in the first object A. Alternatively, as mentioned in the foregoing description with reference to FIG. 22, the user may arrange the second object B in one of the candidate regions indicated by the indicator I. Subsequently, the user can determine a distance of the second object B by touching and dragging the pointer P in the graphic interface G right and left.

The user arranges a location of the pointer P at a random point between 0 and 100 on the graphic interface G, thereby being able to place the second object B between the third sub-object $A_3$ and the fourth sub-object $A_4$ in aspect of the distance from the distance sensing module 142. In particular, if the distance setting command for setting the distance of the second object B is received, the controller 180 of the mobile terminal 100 accesses distance information of the second object B and distance information of a part (e.g., the third sub-object $A_3$, the fourth sub-object $A_4$, etc.) of the first object A contacting with the second object B from the memory and can then determine the order relationship among the second object B, the third sub-object $A_3$ contacting with the second object B and the fourth sub-object $A_4$ contacting with the second object B based on the accessed distance information.

In the case shown in FIG. 22 (b), the mobile terminal 100 can determine the order relationship as the second object B is located between the third sub-object $A_3$ and the fourth sub-object $A_4$. In this instance, the controller 180 of the mobile terminal 100 determines a range of the second object B which will overlay the first image 1110. In FIG. 22 (b), the controller 180 of the mobile terminal 100 can determine that one portion of the second object B overlays the first image 1110 only while the rest of the second object B does not overlay the first image 1110. In particular, the rest of the second object B failing to overlay the first image 1110 may mean a part that is not displayed by being blocked by the third sub-object $A_3$.

Therefore, the user arranges the second object B at a desired location on the first image 1110 and then changes a location of the pointer P on the graphic interface G, thereby being able to determine a range of the second object that overlays the first image 1110.

According to the above-described embodiment, the order relationship between the second object B and the first object contacting with the second object B is determined and at least one portion of the second object is then displayed by overlaying the first image 1110, whereby the first image 1110 and the second object B can be synthesized together more naturally.

Figure 23:
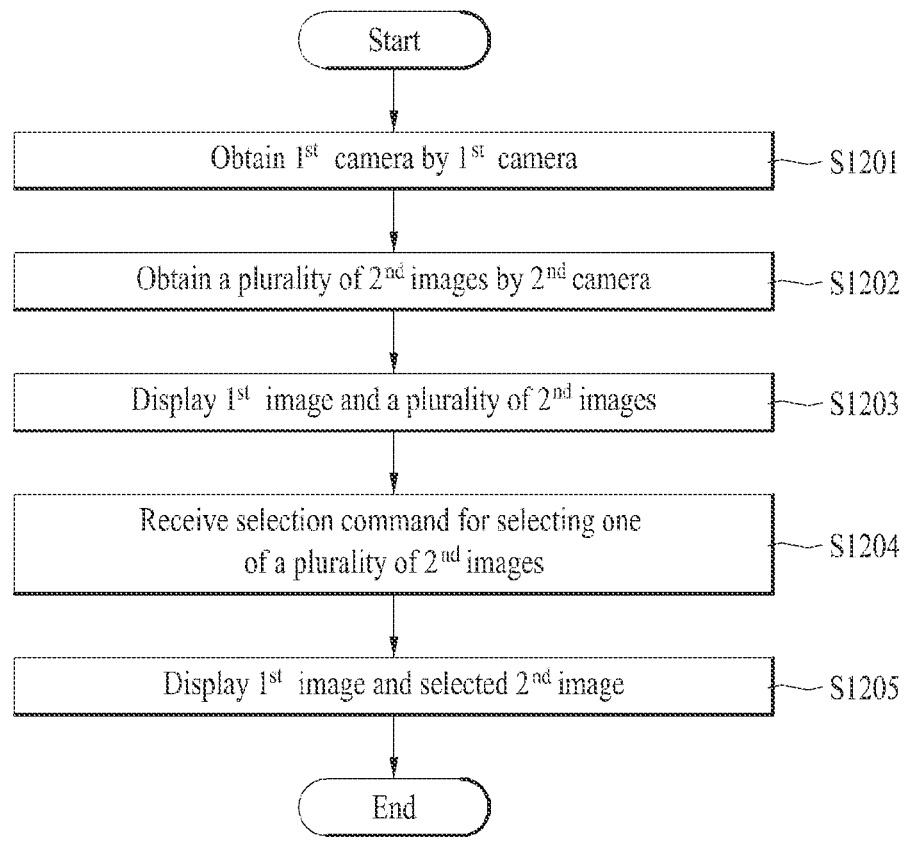
FIG. 23 is a flowchart illustrating one example of a method of controlling a mobile terminal according to one embodiment of the present invention.

FIG. 23 is a flowchart illustrating one example of a method of controlling a mobile terminal according to one embodiment of the present invention. Referring to FIG. 23, the mobile terminal 100 obtains a first image from the first camera (S1201) and also obtains a plurality of second images from the second camera (S1202). If a photographing command is received from the user input unit, steps S1201 and S1202 can be performed together.

The display 151 of the mobile terminal 100 displays the obtained first image and a plurality of the obtained second images (S1203). Subsequently, if a selection command for selecting a prescribed image from a plurality of the second images is received (S1204), the controller 180 of the mobile terminal 100 controls the display 151 to display the first image and the selected second image (S1205).

Figure 24:
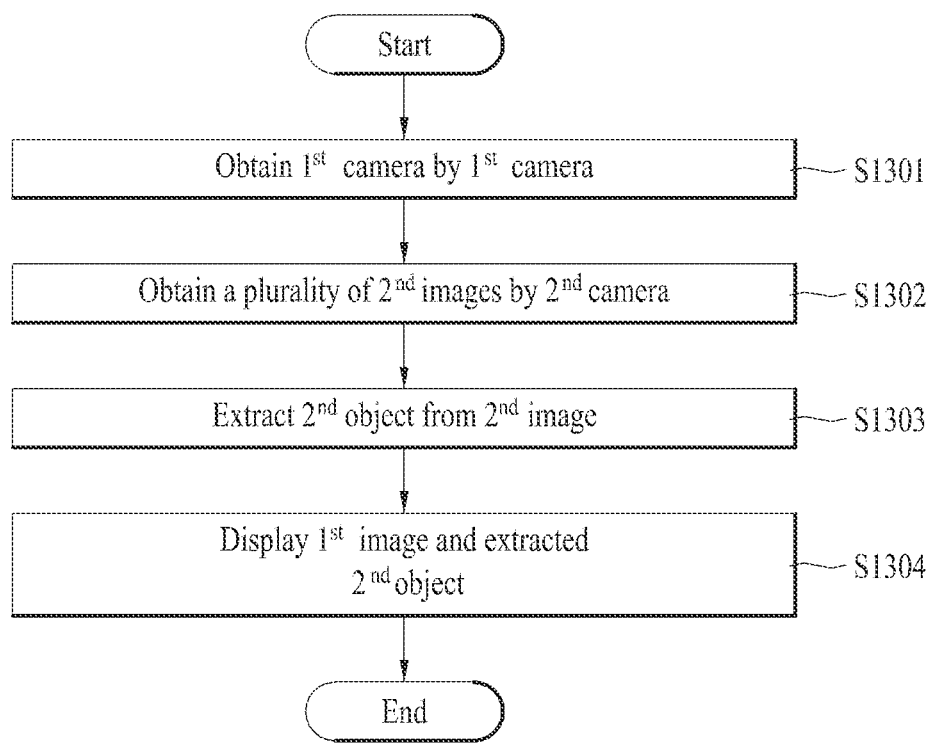
FIG. 24 is a flowchart illustrating another example of a method of controlling a mobile terminal according to one embodiment of the present invention.

FIG. 24 is a flowchart illustrating another example of a method of controlling a mobile terminal according to one embodiment of the present invention. Referring to FIG. 24, the mobile terminal 100 obtains a first image from the first camera (S1301) and also obtains a plurality of second images from the second camera (S1302). If a photographing command is received from the user input unit, the step S1301 and the step S1302 can be performed together.

The controller 180 of the mobile terminal 100 extracts a second object from the obtained second image (S1303). In some instances, the controller 180 of the mobile terminal 100 obtains a plurality of second images from the second camera and can then extract a second object from a prescribed one of the second images selected by a user. Thereafter, the display 151 of the mobile terminal 100 displays the first image and the extracted second object (S1304).

Figure 25:
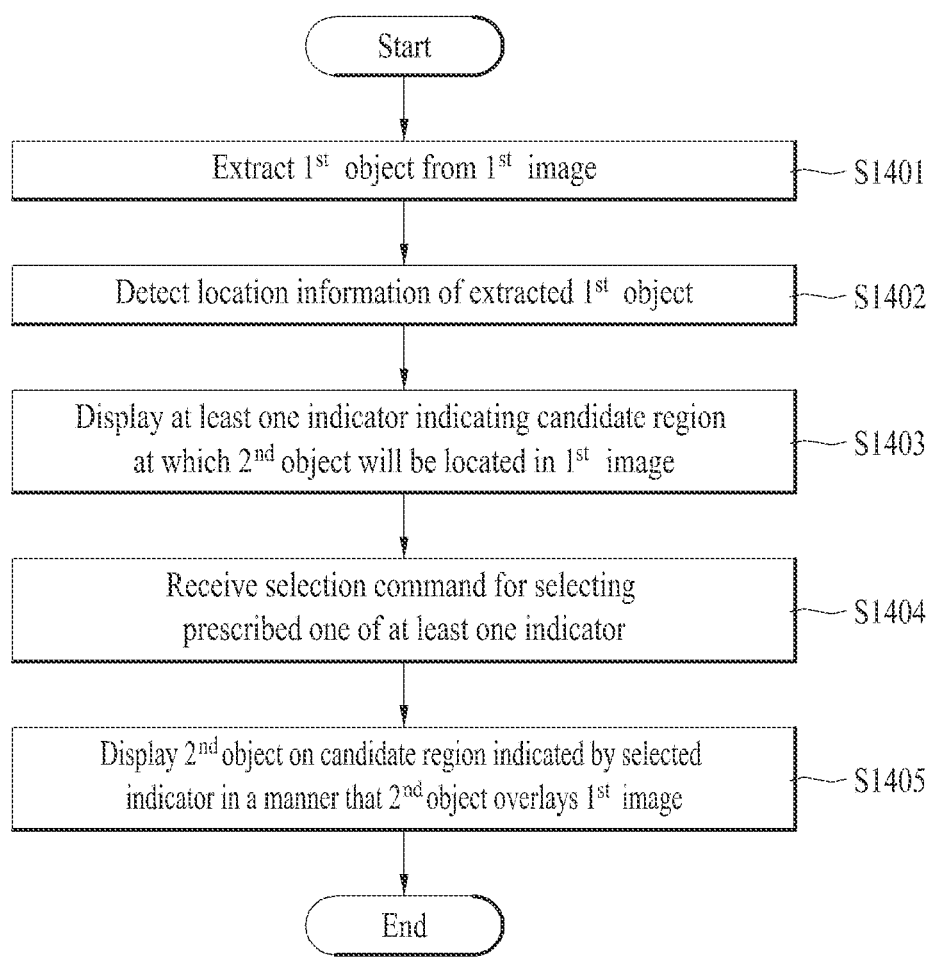
FIG. 25 is a flowchart illustrating further example of a method of controlling a mobile terminal according to one embodiment of the present invention.

FIG. 25 is a flowchart illustrating further example of a method of controlling a mobile terminal according to one embodiment of the present invention. According to an embodiment, the mobile terminal controlling method shown in FIG. 25 can be performed in continuation with the former mobile terminal controlling method shown in FIG. 24.

Referring to FIG. 25, the controller 180 of the mobile terminal 100 extracts a first object from a first image obtained by the first camera (S1401) and then detects location information of the extracted first object (S1402). Subsequently, the display 151 of the mobile terminal 100 displays at least one indicator indicating a candidate region at which a second object will be located within the first image (S1403).

The user input unit 130 of the mobile terminal 100 receives a selection command for selecting a prescribed indicator from the at least one or more indicators (S1404). The controller 180 of the mobile terminal 100 controls the display 151 to display the second object on the candidate region indicated by the selected indicator (S1405). In addition, the second object can be displayed so at least one portion of the second object overlays the first image.

Figure 26:
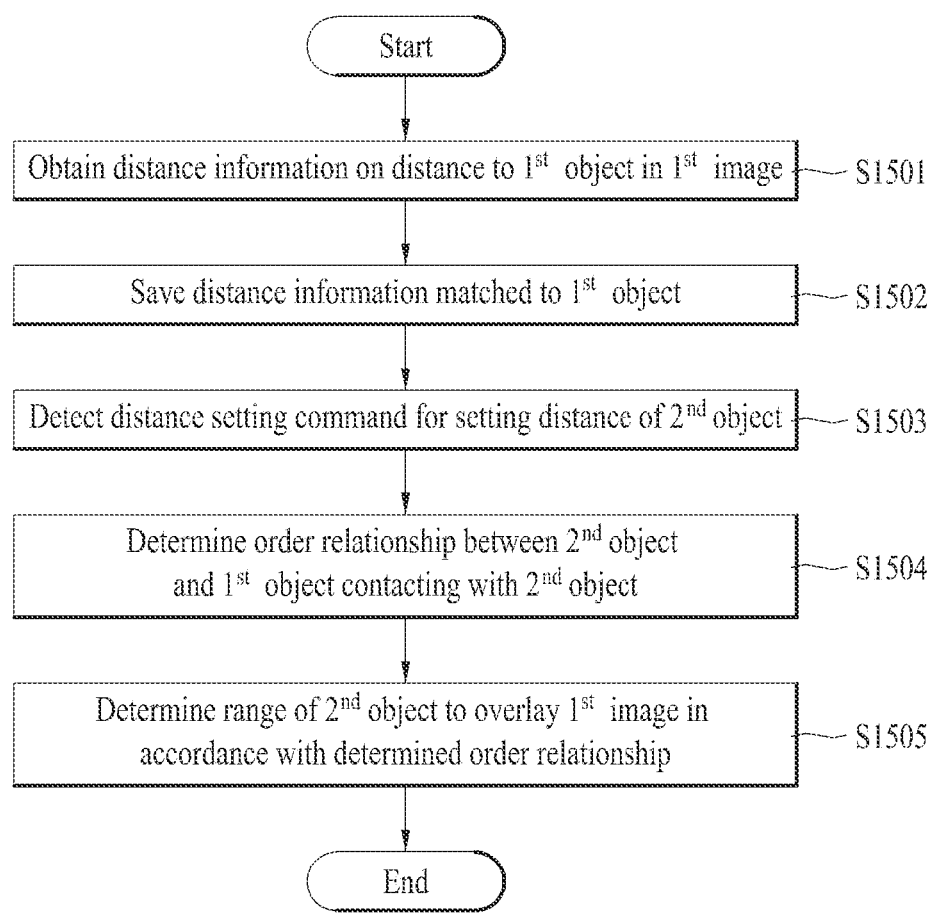
FIG. 26 is a flowchart illustrating another further example of a method of controlling a mobile terminal according to one embodiment of the present invention.

FIG. 26 is a flowchart illustrating another further example of a method of controlling a mobile terminal according to one embodiment of the present invention. Referring to FIG. 26, the controller 180 of the mobile terminal 100 obtains distance information on a distance to a first object in a first image (S1501). The controller 180 of the mobile terminal 100 then controls the obtained distance information to be saved in the memory 160 by being matched to the first object (S1502).

Subsequently, the controller 180 of the mobile terminal 100 detects a distance setting command for setting a distance of a second object (S1503). The controller 180 of the mobile terminal 100 then determines the order relationship between the second object and the first object contacting with the second object (S1504). Thereafter, the controller 180 of the mobile terminal 100 determines a range of the second object, which will overlay the first image, in accordance with the determined order relationship (S1505).

Accordingly, embodiments of the present invention provide several advantages. First, a mobile terminal according to one embodiment of the present invention enables a photographer to pose naturally through consecutive photographing operations and also enables a desired image to be saved by being selected from several images.

Secondly, a mobile terminal according to another embodiment of the present invention can synthesize an image of a photographer and an image of a photographing target together naturally. Thirdly, a mobile terminal according to a further embodiment of the present invention can independently edit/modify an image of a photographer and an image of a photographing target.

Effects obtainable from the present invention is not limited by the above mentioned effect. In addition, other unmentioned effects can be clearly understood from the following description by those having ordinary skill in the technical field to which the present invention pertains.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a first camera on a first surface of the mobile terminal;
    a second camera on a second surface of the mobile terminal;
    a display unit;
    a controller configured to:
    control the first camera to obtain a first image,
    control the second camera to obtain a second image,
    extract a first object from the first image, the first object including a first sub-object and a second sub-object,
    extract a second object from the second image, and
    display the extracted second object on the first image by overlaying the first sub-object on a portion of the second object and overlaying the second object on a portion of the second sub-object;
    a distance sensing module configured to obtain distance information between the first object and the mobile terminal;
    save the distance information to be matched to the first object;
    receive a distance setting command for setting a distance between the second object and the mobile terminal;
    determine an order relationship between the second object and the first object contacting with the second object based on the set distance between the second object and the mobile terminal in response to the distance setting command; and
    determine a range of the second object, which will overlay the first image, in accordance with the determined order relationship.

2. The mobile terminal of claim 1, wherein the first surface is a rear surface of the mobile terminal and the second surface is a front surface of the mobile terminal, and
    wherein the display unit is on the second surface of the mobile terminal.

3. The mobile terminal of claim 1, wherein the controller is further configured to:
    adjust a size of the second object depending on a size of the first object.

4. The mobile terminal of claim 1, wherein the controller is further configured to:
    detect location information of the extracted first object, and
    display at least one indicator on the display unit indicating a region at which the second object will be located in the first image, based on a result of the detection.

5. The mobile terminal of claim 1,
    wherein the first object includes a plurality of sub-objects including the first sub-object and the second sub-object.

6. The mobile terminal of claim 5, wherein the controller is further configured to:
    detect at least one of a size of each of the plurality of sub-objects, a space between two of the plurality of sub-objects adjacent to each other and location information of each of the plurality of sub-objects, and
    display at least one indicator on the display unit indicating a display region, at which the second object will be located in the first image, based on a result of the detection.

7. The mobile terminal of claim 6, wherein the controller is further configured to:
    receive a selection of the at least one indicator, and
    control the display unit to display the second object on the display region indicated by the selected indicator so the second object overlays the first image.

8. The mobile terminal of claim 1, wherein the first object includes a plurality of sub-objects including the first sub-object and the second sub-object, and
    wherein the controller is further configured to save and match the distance information to be matched to each of the plurality of sub-objects.

9. A method for controlling a mobile terminal, the method comprising:
    obtaining a first image via a first camera of the mobile terminal;
    obtaining a second image via a second camera of the mobile terminal;
    extracting, via a controller of the mobile terminal, a first object from the first image, the first object including a first sub-object and a second sub-object;
    extracting, via the controller, a second object from the second image;
    displaying the extracted second object on the first image on a display unit of the mobile terminal by overlaying the first sub-object on a portion of the second object and overlaying the second object on a portion of the second sub-object;
    obtaining distance information between the first object and the mobile terminal via a distance sensing module of the mobile terminal;
    saving the distance information to be matched to the first object;
    receiving a distance setting command for setting a distance between the second object and the mobile terminal;
    determining an order relationship between the second object and the first object contacting with the second object based on the set distance between the second object and the mobile terminal in response to the distance setting command; and
    determining a range of the second object, which will overlay the first image, in accordance with the determined order relationship.

* * * * *